(12) United States Patent  (10) Patent No.: US 6,700,100 B2
Lerner  (45) Date of Patent: Mar. 2, 2004

(54) ENHANCED VISIBILITY HEAT ALERT SAFETY DEVICE FOR HOT SURFACES

(76) Inventor: William S. Lerner, 215 E. 68th, St. Apt. 23A, New York, NY (US) 10021-5729

( * ) Notice: Subject to any disclaimer, the term of this patent is extended or adjusted under 35 U.S.C. 154(b) by 0 days.

(21) Appl. No.: 10/238,348

(22) Filed: Sep. 10, 2002

(65) Prior Publication Data
US 2003/0006227 A1 Jan. 9, 2003

Related U.S. Application Data

(63) Continuation-in-part of application No. 09/788,594, filed on Feb. 21, 2001.

(51) Int. Cl.$^7$ .................................................. H05B 3/68
(52) U.S. Cl. .................................................. 219/445.1
(58) Field of Search .......................... 219/445.1, 446.1, 219/448.11, 460.1, 465.1; 374/161, 162; 428/1.1; 349/11, 12, 20, 21, 16; 40/448

(56) References Cited

U.S. PATENT DOCUMENTS

| 2,870,316 | A |   | 1/1959 | Ferguson, Jr. | 219/37 |
| 3,802,945 | A | * | 4/1974 | James | 428/1.5 |
| 3,822,594 | A |   | 7/1974 | Parker | 73/356 |
| 3,959,787 | A |   | 5/1976 | Messmann et al. | 340/227 |
| 3,965,742 | A |   | 6/1976 | Parker | 73/356 |
| 4,102,200 | A |   | 7/1978 | Kelsch, Jr. | 73/371 |
| 4,189,942 | A |   | 2/1980 | Giezen et al. | 73/356 |
| 4,351,996 | A |   | 9/1982 | Kondo et al. | 219/10.49 |
| 4,649,854 | A |   | 3/1987 | Janke et al. | 116/216 |
| 4,682,857 | A |   | 7/1987 | Tan | 350/331 |
| 4,738,549 | A | * | 4/1988 | Plimpton | 374/208 |
| 4,751,912 | A |   | 6/1988 | Monette | 126/307 |
| 4,806,858 | A |   | 2/1989 | Elbicki | 324/205 |
| 4,983,810 | A |   | 1/1991 | Balderson | 219/462 |
| 5,315,956 | A |   | 5/1994 | Reno | 116/216 |
| 5,482,373 | A | * | 1/1996 | Hutchinson | 374/141 |
| 5,499,597 | A | * | 3/1996 | Kronberg | 116/216 |
| 5,543,246 | A |   | 8/1996 | Treger | 429/90 |
| 5,750,959 | A |   | 5/1998 | Plumptre | 269/465 |
| 5,767,489 | A |   | 6/1998 | Ferrier | 219/497 |
| 5,786,578 | A |   | 7/1998 | Christy et al. | 219/720 |
| 5,997,964 | A | * | 12/1999 | Klima, Jr. | 428/1.54 |
| 6,104,007 | A |   | 8/2000 | Lerner | 219/453 |

FOREIGN PATENT DOCUMENTS

DE   3835735   4/1990   ............. G09F/9/00

OTHER PUBLICATIONS

Chang, "Chemistry Nobel Recognizes 3 Scientists for work in Plastics", Oct. 11, 2000, New York Times.
Chang, "Scientists Envision a New Electronics Based on Plastic"; Oct. 17, 2000, New York Times.

* cited by examiner

Primary Examiner—Sang Paik
(74) Attorney, Agent, or Firm—Steven Horowitz

(57) ABSTRACT

A hot-button type heat alert safety device attachable to a surface, such as metal or glass, for warning individuals that the surface is hot, comprising a thermochromic composition, a button-shaped container for housing the composition, having a convex face, the convex face overlying said composition and the container container being transparent in at least a portion of the container overlying the thermochromic composition. The thermochromic composition is shaped in a predetermined symbol which communicates that an underlying surface is dangerously hot, substantially visible through the convex face of the container, and designed to undergo and maintain a readily perceptible color change whenever the temperature of the hot surface exceeds a predetermined temperature.

32 Claims, 10 Drawing Sheets

F I G. 8
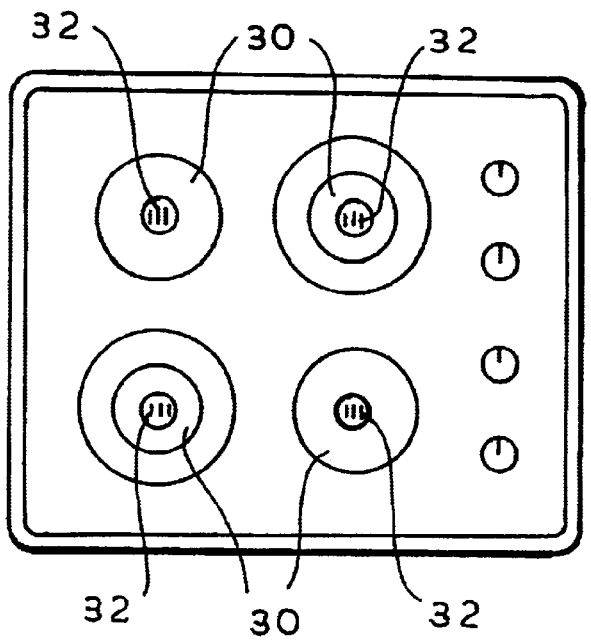
F I G. 9
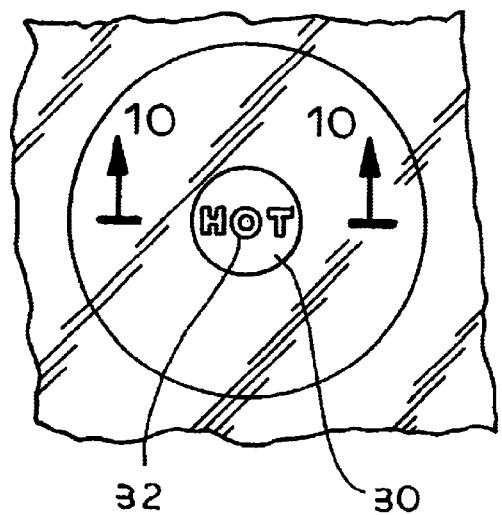
F I G. 10
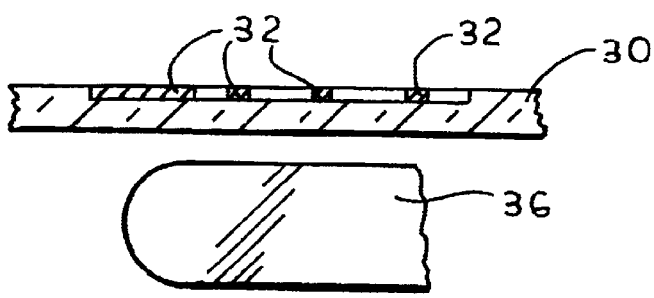

FIG.11
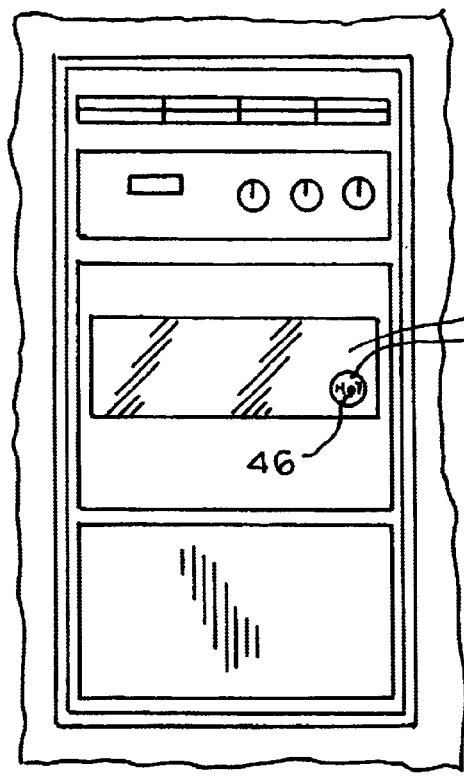
FIG.12
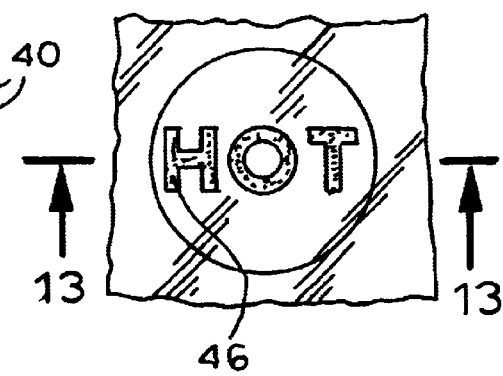
FIG.13
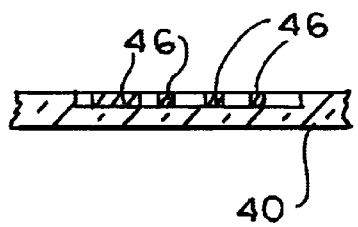
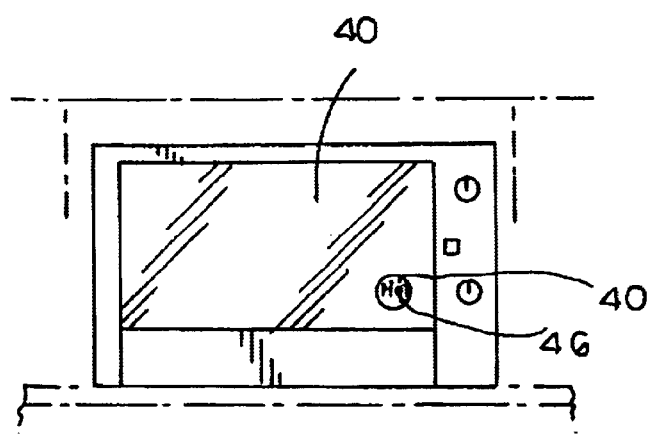
FIG.14

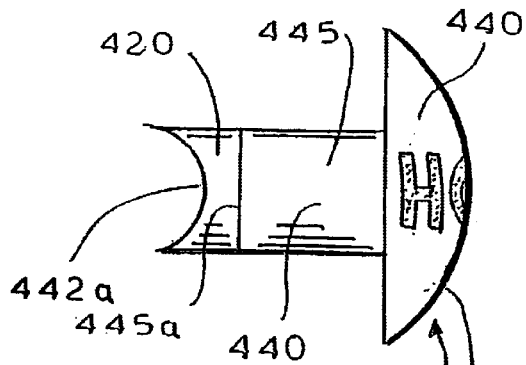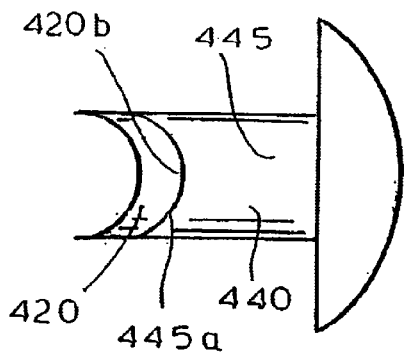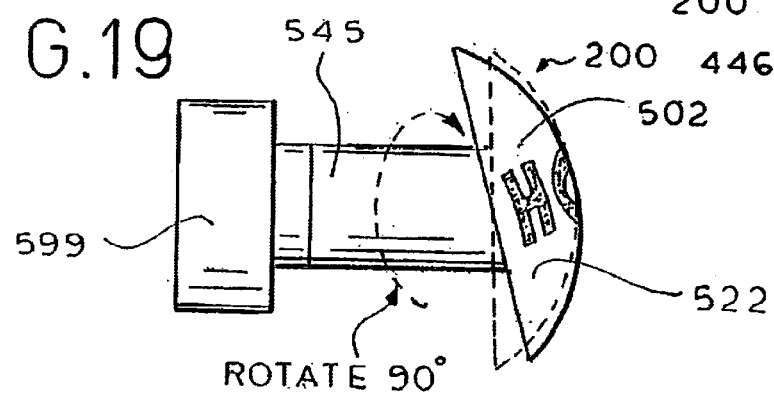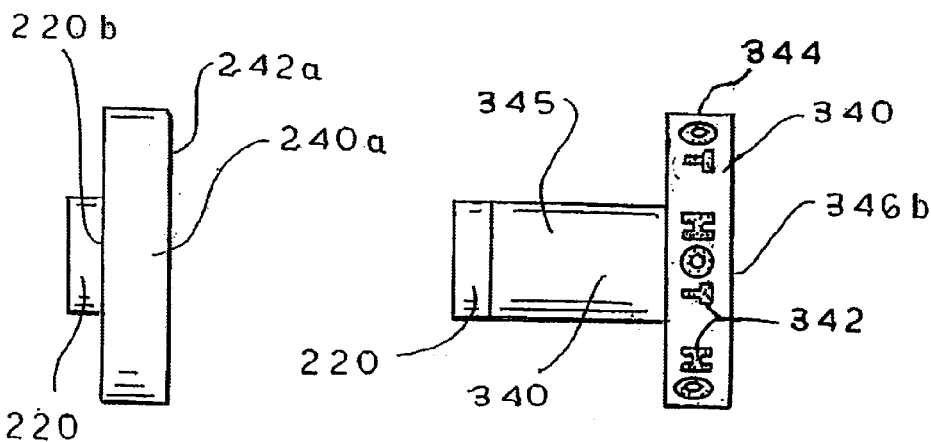

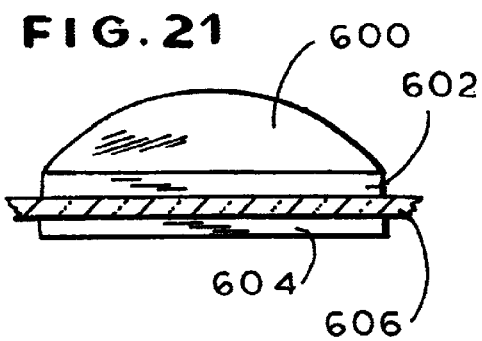
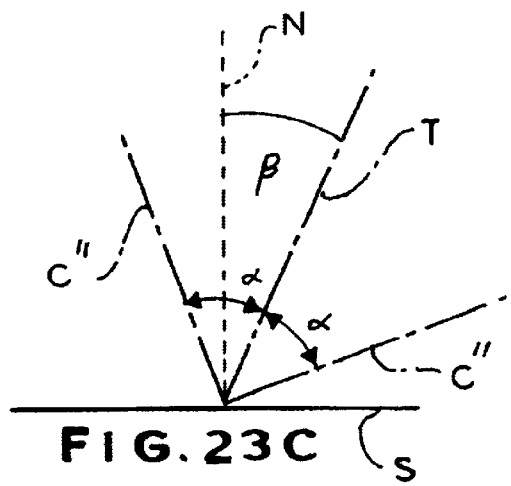
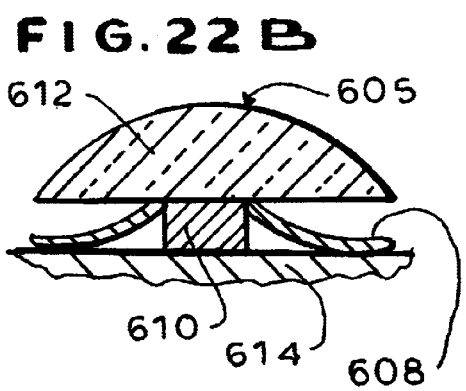
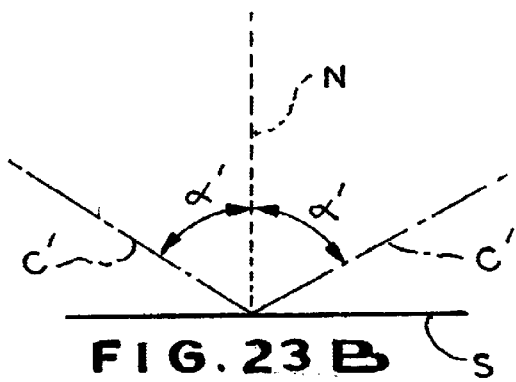
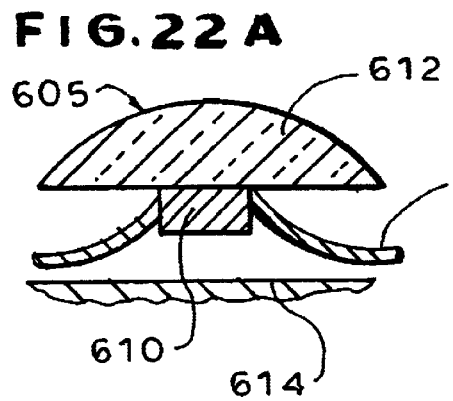
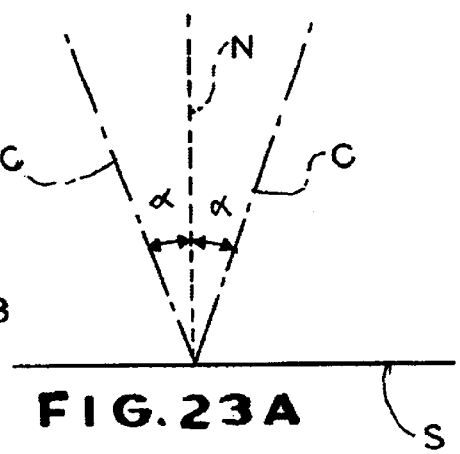

ENHANCED VISIBILITY HEAT ALERT SAFETY DEVICE FOR HOT SURFACES

PRIORITY INFORMATION

This patent application is a continuation-in-part patent application of U.S. patent application Ser. No. 09/788,594 previously filed by Applicant and Inventor William S. Lerner on Feb. 21, 2001 and which is incorporated herein by reference in its entirety.

FIELD OF THE INVENTION

The present invention relates to safety devices used in cooking or other activities involving hot surfaces, and in particular it relates to safety devices which alert someone that the surface of a stove or other appliance or device is too hot to touch. The present invention also relates to detachable heat alert safety devices for any hot surface.

BACKGROUND OF THE INVENTION

With respect to stoves and related appliances, various kinds of stoves—electric, gas, smooth cooktop using glass or metal tops—and toaster ovens are well known to be used for heating food. In addition, "mobile stove-type appliances" such as hot plates and warming trays are well known to be used for heating food. Each of these kinds of stoves and "mobile stove-type appliances" present a safety problem since the heating elements of the stove are hot during the cooking process and remain hot well afterwards. During the cooking process, the safety problem caused by touching the heating element is mitigated somewhat by visual inspection of the stove. With a gas, electric or smooth top stove, for example, the presence of a pot or other utensil on top of the stove might alert someone to the fact that the stove appears to be in use for cooking and therefore too hot to touch. Even the presence of a pot or other utensil is not a reliable clue, however, since people tend to leave tea kettles on their stove perpetually. When the cooking process has ended, however, it is generally impossible to detect that the heating elements of the stove remains hot and would burn the skin of anyone who touched them. There is no visual or other clue that the stove is hot.

To some degree, adults have developed an inherent caution when approaching stoves because of their experience and knowledge in dealing with such safety problems. This inherent caution, however, does not obviate the need for a device that warns the adult when touching the stove would be dangerous. Moreover, children, and particularly young children, usually have not developed such a watchfulness and there has long been a need for a device that can prevent burn accidents to children who may inadvertently touch a stove that is hot, especially when the stove remains hot well after the cooking process has ended.

Furthermore, the reduction in the size of modern kitchens has led the occupants of modern apartments to make use of the stove as an extension of the counter top adjacent the stove as a resting places for large items that have been carried into the kitchen area. An example of such items is heavy bags of groceries brought into the kitchen. There is an urge to set the bags down on the nearest flat surfaces, which may be the top of a stove adjacent a counter top. This is particularly true for those stoves that are smooth on top, such as smooth cooktops. In general, the top surfaces of modern kitchen stoves are increasingly flat, especially the top surfaces of smooth cooktops. These factors have only increased the danger to adults when the top surfaces of stoves are used as a resting place for packages, such as groceries brought into the kitchen.

Smooth cooktop stoves presently are also dangerous if touched on their top surface when they are still hot, even after use. These smooth cooktop stoves, or "smoothtops" as they are sometimes called, utilize as the heating element separate areas on the top surface of the stove (at the same location that gas stove would have burners) which are made of glass. Under each area, usually circular, is a strong light source, such as a halogen lights. The light source projects the light upward to the surface area of the smoothtop's heating element—the glass area on the top surface of the stove. Since the glass area is coated on its bottom with a dark coating, when the light strikes it, the heat from the strong light is absorbed by the glass area and these glass surfaces form each heating element of the stove.

Another variation of the smooth cooktop is the use of a "ribbon heating element" where the smooth glass surface is heated by a coiled electric circuit called a "ribbon element" just underneath it instead of by a halogen light source. The heat is transmitted directly upward so that only the heat element itself gets hot and the rest of the cooktop surface remains cool. In some cases, the ribbon heating element also has another feature whereby the heating element is made of two concentric circles so that the option exists of two sizes of the heating element to match the two different sizes of the pans that need to be heated. This new technology does not solve the problem of warning adults and children that the heating element should not be touched when the cooking process has ended. If anything, it generates the additional hazard that someone can be lulled into touching the heating element after thinking the heating element is cool since the surface right adjacent to it is indeed cool.

Some of these problems have been addressed in earlier patents, through use of thermochromic inserts or overlays. Thermochromic materials are those such as some liquid crystals which change color when passing through a given temperature range, and are now familiar from use in inexpensive items, like temperature indicating refrigerator magnets or stick-on aquarium thermometers.

These devices however still suffer from some drawbacks. Flat appliable thermometers tend to be made of plastic, and would melt or be destroyed at the temperatures reached by a kitchen oven. Higher temperature chemical temperature indicating systems are known, such as the semiconductor cadmium sulfide, but must either be included as inserts in original equipment manufacturing, or fired on as a vitreous ceramic. Materials which are both capable of resisting high temperature and are transparent, or which are themselves thermochromic, are brittle, and so unsuitable for forming in thin flat removable displays, which makes it difficult to attach these materials to an existing surface, the way refrigerator magnet thermometer is attachable.

In an additional drawback of the prior art, flat indicators, embedded in or applied to a flat surface, are necessarily only usefully visible through a limited viewing angle. It is readily shown through trigonometry that if an observer is offset an angle $\alpha$ from the vertical or normal to a surface, which offset is also referred to as the angle of incidence, the apparent area of objects on the surface will be reduced by a factor of $\cos(\alpha)$: $A' = A\cos(\alpha)$. For example, if an observer is offset 60° from the vertical, i.e., at a 60 degree angle of incidence, viewing a surface from 30° to the surface itself, the apparent size of objects on the surface is reduced by $\cos(60) = \frac{1}{2}$. For an observer at an angle of incidence of 80° the apparent size has shrunk to less than 18% of the actual size; and at 85° apparent size is less than 9% of actual. An angle of incidence approaching 90° from the vertical is known as a grazing angle. At grazing angles a flat indicator on the surface clearly approaches zero apparent area, and is completely invisible to the observer.

A second problem that arises from looking at something at an angle of the line of sight is specular reflection. Specular or mirror reflection is the reflection of light rays hitting a flat surface with a reflected ray having an angle of incidence equal to that of the incident ray. For most surfaces specular reflectance increases with angle of incidence, so that more ambient light is reflected to a viewer at larger angles of incidence of the line of sight. This effect wipes out the contrast of a display, so that the display cannot be read at large angles, even if the apparent area of the display were otherwise large enough. Depending on the type of materials used, the loss in visibility at a given display angle may be worse than that predicted by apparent area alone. Liquid crystals for example show a contrast with background notably affected by viewing angle, and readability of a liquid crystal display may be degraded at lower angles of incidence than other kinds of display.

In consideration of these two effects, loss of apparent viewing area and increase in specular reflection, flat warning devices are mainly suitable for surfaces usually seen from small angles of incidence. Examples of such surfaces are vertical surfaces near eye-level, like a door of a cabinet mounted oven, or horizontal surfaces significantly below eye-level, like a stove top surface considered in relation to a typical adult height.

However, for a child an ordinary stove top may be near or even above eye level, while small hands can nonetheless reach over the top of a stove to touch dangerously hot surfaces. Similarly, even for an adult some vertical surfaces such as an oven door, may be below eye level, and hence only visible at a large angle of incidence. This would occur while a user is standing at the stove and reaching down to open the oven door. A flat indicator therefore will not be prominent or attention getting in these situations, and may even be invisible to a user.

With respect to toaster ovens, because of the mobility of the unit the danger of touching the window of a toaster oven exceeds that of the typical immobile oven. The toaster oven can be placed on a counter top or other portion of the kitchen not directly in the "cooking center". Consequently, an adult and especially a child, or the elderly, is not likely to remember not to touch a window of a toaster oven when it is off (soon after it had been on). In addition, the door of a toaster oven can be left open and jut out further toward someone in the kitchen.

Presently, in order to address the danger of touching a hot "smoothtop" stove, such stoves generally have several light indicators, each one corresponding to each heating element, all located in small one rectangular area on the surface of the cooktop. The light indicators remain lit for a certain length of time after the stove's heating element is turned off in order to deter someone from touching the heating element when it is still hot, although "off". Unfortunately, this attempt to address the danger of touching a hot stove of the smooth cooktop variety is insufficient as a warning system (putting aside the fact that the light indicators are designed only for the smooth cooktop variety stoves to begin with and not for gas and electric coil stoves).

A quick glance at the group of light indicators would not be sufficient to warn the average adult, no less children or the elderly, that a particular heating element is too hot. This is because the group of light indicators do not immediately tell someone which heating elements correspond to which light indicators. At a minimum, several seconds of concentration are needed in order to determine from the light indicators that are "on", which heating elements are too hot to touch. Many adults, and certainly most children, cannot afford those seconds of deduction since their desire to touch the stove is immediate. In addition, an adult carrying groceries into the kitchen and looking for a counter top to place them on or a child running into and playing in the kitchen are even less likely than the average adult or child to take the time to engage in a several second thinking process. Accordingly, the child or the adult will be inadequately warned about the danger of being burned. With this in mind, it is no surprise that a 1997 industrial design exhibit at the Cooper Hewitt (Smithsonian) in New York demonstrated that over 69% of adults can not match the control knob with its corresponding burner (i.e. heating element) on a stove.

There is also not presently known any effective warning method for the vertical surfaces of oven windows, including the windows of wall ovens, regular ovens and toaster ovens, and especially when such vertical surfaces are not at or near eye level for a user, as mentioned above. This is particularly important since when the oven is turned off, the oven window remains very hot even though it appears that everything is off.

While devices that make use of liquid crystal compositions are known to indicate the surface temperature of an appliance, these devices are not designed to warn someone of the danger of touching hot stoves. For example, U.S. Pat. No. 3,827,301 to Parker discloses an apparatus for indicating the temperature of a surface of an appliance. It has a first portion in contact with the appliance surface or connected by copper wires or heat pipes to the appliance surface. It has a second portion, a poor heat conducting member in heat exchanging relationship to the ambient environment, that has bands of liquid crystal material extending away from the first portion thereby creating a temperature gradient extending away from the surface of the appliance.

Devices such as disclosed in Parker that provide temperature determinations are not adequate for instantly warning a child or even an adult that the heating element of a stove is too hot to touch for one thing because quantitative temperature determinations are inadequate to provide the immediate warning that is necessary. Moreover, the device of Parker and other liquid crystal compositions are not specifically suited to be manufactured as part of a stove. In addition, these devices are not suitable as attachments to stoves and certainly not as attachments to a smooth cooktop stove.

The present invention is also applicable, not just to stoves and related appliances, but to any other surface that one may need to be warned that it is hot. There are numerous devices whose surfaces become hot and remain hot even after the device has been shut off either electrically or otherwise. For example, a radiator cap becomes hot and remains hot for a period when the vehicle and radiator are shut off. Also, any kind of piping that is a conduit for hot liquids is an example of a surface that one may need to be warned that it is hot. Other devices having hot surfaces include hot surfaces on fireplace doors, flat irons, chafing dishes, coffee urns, heating pipes, home radiators, glue guns, oven doors, portable heaters of the electric, oil and ceramic disc type, kerosene lamps, kerosene heaters, barbecue grills of the electric, gas or charcoal type, electric woks, electric skillets, deep fryers for home or commercial use, heat lamps in self service cafeterias and salad bars, saunas including the metal box that generates and/or controls the heat, rotisseries, indoor grills whether gas or electric, tea kettles, wood burning stoves, hot electric rollers, hot wax holders used for beauty treatments, bonnet type hair dryers, synthetic braid trimmers, curling irons, portable generators, steam cleaners especially such as in dry cleaning facilities, hot water pipes that are exposed, hot water heaters, furnaces, warming trays, light fixtures such as halogen lamps, popcorn makers (especially commercial ones), toasters, cappucino and espresso makers, autoclaves used to sterilize instruments in a medical setting, movie projectors and other such hot surfaces. These and other hot surfaces are exposed to children, maintenance works and ordinary adult users.

Accordingly, there is needed a versatile, easily movable and mountable, removably attachable and detachable, and effective, convenient and easy to manufacture device for warning adults, workers and children instantly when any kind of surface, whether it be a stove of any kind or any other surface, is too hot to touch. There is also a need for such a device that is both capable of installation on a previously purchased stove of any known type, including cooktops, electric and gas stoves, and one that is also capable of being manufactured as part of the stove by stove manufacturers. The present invention addresses and satisfies all of these needs and provides other advantages.

There is also a need for an effective, convenient and easy to use, and detachable heat alert safety device that is easily read and understood for warning adults and children when any surface is too hot to touch. Such a device should ideally be positionable at a variety of heights or positions so that it can be custom tailored for children of different height.

Importantly, moreover, there is a need for a heat alert safety device that is versatile enough to be easily positioned on a hot surface and yet be able to be easily removed thereafter when it has served its purpose—either with respect to that surface or it has served its purpose with respect to that particular individual or it has served its purpose for that individual for that particular moment—and then be repositioned elsewhere—either on another hot surface of another object or another surface of the same object or even another portion of the same surface of the same appliance. This is necessary because in order for the heat alert safety device of the present invention to be effective it has to be visible (or at least discernable) and in addition it should be discernable and effective for children, and since children of different ages are of different heights it is advantageous to be able to attach the device to. It is also necessary because a particular individual may decide to relocate the heat alert safety device when a different appliance is used or when a different portion of a kitchen counter is used, or when any other object with a hot surface is activated. It should be noted that by "activated" is included situations when an object is "hot" a certain amount of time after the source of the heat was "on" and it is of course not intended that the device of the present invention is limited to situations when electricity is "on" for an appliance or other object.

In light of the above discussion there is a need for a device which (i) is suitable for temperatures at least up to a high temperature of a gas oven (500° F.) (ii) is capable of conveying information at a grazing angle of sight, relative to the surface the device is mounted on (iii) may be detachably mounted on an existing surface. It is believed that no heretofore known product simultaneously meets these requirements. It would also be advantageous if the device were simple and rugged and could withstand chance mishandling or rough treatment.

SUMMARY OF THE INVENTION

In the present invention chemical compositions that change color and remain at that color when they reach or exceed a certain temperature (referred to generally herein as "thermochromic compositions"), such as cholesteric liquid crystals or various types of liquid crystal polymers designed to turn color when they reach a certain temperature, and that are shaped in the outline of the word "HOT" are embedded in a device attachable to or forming a part of any hot surface such as the top surface of the heating element of stoves so that they change color and instantly alert anyone, including a child, that the heating element of the stove is too hot to touch even when the stove or other device is "off".

The present invention is a lightweight convex button type temperature surface warning device, or "hot button". The device preferably fits in the palm of the human hand and resembles a campaign button's outer shape. The device is distinguishable over earlier art in that a warning signal represented by a thermochromic material is visible over a substantially increased arc, at least up to grazing angles with a not surface, whereas at such angles existing flat indicators would be useless. A "grazing angle" is any small angle approximately less than 10°, and down to and including 0°. In some embodiments and applications, a warning signal may be visible below a grazing angle, i.e., from an angle of sight below the hot surface. In one embodiment a thermochromic composition is enclosed in an optically clear, physically rugged and convex button or lens, typically manufactured of tempered glass. In another embodiment, the thermochromic composition is embedded in a convex surface of such a button, which in this embodiment may be opaque. The thermochromic composition is however preferably embedded in a back side of the button which is manufactured out of a moderately heat conductive material like glass, to minimize a thermal lag between the protected surface and the indication, whereas a button manufactured out of a good thermal conductor such as aluminum will function satisfactorily with the thermochromic composition embedded in the front surface. The rear surface of the button may be either flat or concave.

In any case the device is entirely constructed out of material able to withstand repeated cycling to a temperature of approximately 500 degrees Fahrenheit or more, and able to withstand rough treatment. The thermochromic material is shaped in a predetermined symbol or shape, such as the English letters "HOT" or such letters in another language, or in the background of such a symbol, communicating to a viewer that a surface is dangerously hot. The symbol may also take the form of a exclamation point, an international "no" symbol superimposed a stick diagram of a figure touching a surface, a stylized human face showing shock or pain, a representation of flames, or any other recognizable warning symbol. Preferably the symbol or its background should lie in the color range red-orange-yellow, commonly recognized colors of both high temperature objects and of required caution.

In a further embodiment of such invention, the warning symbol is repeated or a pattern of thermochromic material is extended over a larger portion over a first or rear side of a convex button or lens so that a warning signal is yet more viewable over a wider range of angles from a second or front side of the button. The words "HOT! HOT! HOT! may for example be repeated in a horizontal strip running across or behind a convex face so that at least one complete word is visible from a larger range of horizontal angles. Alternatively an abstract pattern such as alternating wavy lines or a field of exclamation points, normally invisible and becoming red and black at a predetermined temperature, can be continued across a front or back surface of the button, so that portion of the pattern visible to a viewer on the front side of the button will suffice to convey the warning.

As discussed in the background section, visibility of a flat warning signal is usually unacceptable greater than 70° to either side of a normal (perpendicular line) of the protected surface, and rapidly becomes worse as the viewing angle approaches 90°. The "viewing angle" or angle formed with the normal to the surface is also referred to as the angle of incidence, or in particular the angle of incidence of the line of sight. In contrast to a flat panel display, the device of the present invention allows a warning to be communicated to a user at viewing angles up to 90° from the vertical, or grazing the surface. The warning signal in some applications will even be visible from slightly beneath the surface—an angle of incidence greater than 90°—provided a line of sight exists from the observer to a projecting portion of a display face of the device. The wide range of visibility is achieved by a use of clear material as a convex container for a thermochromic composition, and by an optional tiltable mounting enabling orientation of an axis of maximum visibility to be repositioned. Alternatively the effect is achieved by using a cap of heat conducting and possible opaque material, such as aluminum, with a thermochromic material on or in a convex front surface of the cap. This arrangement is also optionally combined with a tiltable mounting.

The utility of this invention where a person may be tempted to reach around a corner to grasp a handle on a hot surface or when a small hand is attached to a child tempted to reach on top of a stove, will be readily appreciated.

In optional embodiments of such invention a preferred range or solid cone of viewing angles is selectable by pivoting a button element mounted on an end of a stalk. This arrangement is also called a "mushroom" arrangement. The stalk in this case is long enough to permit a pivoting through a predetermined range of angles of the head or button without interfering with the protected surface. In cases where the pivot is not used the stalk may be shorter, any length down to a minimum thickness necessary for mounting on a surface.

The hot-button is temporarily affixed to ferrous (magnetic) surfaces by means of high-temperature resistant ceramic magnets, which are usable up to approximately 800° F. For yet higher temperatures, such as a side of coal-fired barbeque grills, a high temperature cement is used to permanently attach the button to the surface. Some embodiments may include a metal backing welded to a screw thread or other attachment post, which may be passed through a hole in a metal or glass surface and secured, for example, with a lock-washer and nut.

The unique features of the present invention include the large range of viewing angles achieved by a combination of optical and geometrical means, combined with a temperature service range extending at least to 500° F., rendering the device suitable for ovens and other cooking appliances, and visible at a grazing angle to the surface.

For completeness, various other embodiments which were disclosed in my prior application, of which this application in a continuation-in-part, will now be summarized.

In another embodiment described and claimed in my previous patent, U.S. Pat. No. 6,104,007, for use on electric stoves, the device is an improved electric coil whose central area contains the liquid crystals. In a second embodiment for use on smooth cooktop stoves, wall ovens and toaster ovens, the thermochromic display is embedded in the glass areas that form the heating elements of the smooth cooktop stove. As an alternative to the second embodiment, for smooth cooktop stoves, the thermochromic display is in the shape of a ring surrounding the heating element (and visible when pots are placed on the heating element) which ring may have an interrupted area in the outline of the letters "HOT"). In a third embodiment for gas stoves also described and claimed in U.S. Pat. No. 6,104,007, the thermochromics are embedded in a recessed disk mounted on top of the central element of the gas stove's burner. In each embodiment, the thermochromics stay red as long as the temperature they sense exceeds a certain degree Fahrenheit, such as 115 degrees Fahrenheit, which has been found to be too hot to touch. In a fourth embodiment for use on wall ovens and toaster ovens, the thermochromic display is embedded in the glass areas that form the heating elements of the smooth cooktop stove.

In one embodiment described in detail herein, in order too achieve removable attachability and placement, the heat alert safety device is made of two part, a half-dollar disk made of Pyrex and containing the thermochromic composition and an attachment and heat conducting element in a disk in the shape of a dime on the back of the half-dollar shaped disk.

Objects and Advantages

The following important objects and advantages of the present invention are:

(a) to provide a device that instantly warns anyone including a child that the surface of a stove, hot plate, the window of a toaster oven, or other hot surface is too hot to touch, (b) to provide a versatile heat warning device that can be used for smooth cooktop stoves having any kind of surface including glass or metal and using any kind of technology including electric heating, electric induction and halogen light heating, or can be used for electric stoves, or for gas stoves, for wall ovens, for toaster ovens, for hot plates or for warming trays, (c) to provide a device visible to the extent of providing a warning through an arc of at least 180 degrees about the vertical to a protected surface, (d) to provide a heat warning device that is easy to manufacture and that can be either installed onto the stove (or other appliance's) heating element or can be manufactured as part of the stove, (e) to provide a heat warning device for stoves that can be calibrated to produce a warning symbol only when a certain temperature, such as 115 degrees Fahrenheit, is reached and that can remain in signaling mode as long as such temperature is exceeded by the appliance surface, (f) to provide a heat warning device as above that makes use of thermochromics that change color when a certain temperature is reached, such as cholesteric liquid crystals or cadmium sulfide semiconductors designed to change color when a certain temperature is reached, (g) to provide a heat warning device that is removably attachable to a wide variety of hot surfaces in a very simple manner, (h) to provide a heat warning device that can is readable by children and whose placement can be adjusted when the child grows taller, (i) to provide such a heat warning device that can be angled for easier reading on surfaces in out-of-the-way locations such as pipes, (j) to provide such a heat warning device that contains a magnet or an electrically conductive plastic that makes the device removably attachable to any hot metal, glass or other suitable surface and capable of receiving heat transmitted from the hot surface and transferring it to the thermochromics that change color when a certain temperature is reached and (k) to provide a heat alert safety device that is readily attachable to and detachable from hot surfaces on fireplace doors, radiator caps, irons, chafing dishes, coffee urns, heating pipes, home radiators, glue guns, oven doors, portable heaters of electric, oil and ceramic disc, kerosene lamps, kerosene heaters, barbecue grills of electric, gas or coal, electric woks, electric skillets, deep fryers for home or commercial use, heat lamps in self service cafeterias and salad bars, saunas including the metal box that generates and/or controls the heat, rotisseries, indoor grills whether gas or electric, tea kettles, wood burning stoves, hot electric rollers, hot wax holders used for beauty treatments, bonnet type hair dryers, curling irons, portable generators, steam cleaners especially such as in dry cleaning facilities, hot water pipes that are exposed, hot water heaters, furnaces, warming trays, light fixtures such as halogen lamps, popcorn makers (especially commercial ones), toasters, cappucino and espresso makers, autoclaves used to sterilize instruments in a medical setting, movie projectors and other such hot surfaces.

BRIEF DESCRIPTION OF THE DRAWINGS

FIG. 8 is a top plan view of the device of the present invention on the smooth surface of a cook top stove.

FIG. 9 is an enlarged fragmentary plan view of one heating element of a smooth cook top stove having the device of the present invention.

FIG. 10 is a enlarged fragmentary cross-sectional view taken along line 10—10 of FIG. 9.

FIG. 11 is a front elevational view of a wall stove having the device of the present invention.

FIG. 12 is an enlarged fragmentary front elevational view of one heating element of a smooth cook top stove having the device of the present invention.

FIG. 13 is a enlarged fragmentary cross-sectional view taken along line 13—13 of FIG. 12.

FIG. 14 is a front elevational view of a wall oven having the device of the present invention.

FIG. 18A is a side view of an alternative embodiment of the device of the present invention for attaching to rounded hot surfaces.

FIG. 18B is a side view of an additional alternative embodiment of the device of the present invention for attaching to rounded hot surfaces.

FIG. 19 is an alternative embodiment of the device of FIG. 16A that can be positioned at different angles.

FIG. 20A is an alternative embodiment of the device of FIG. 15A including a straight face.

FIG. 20B is an alternative embodiment of the device of FIG. 16A including a straight face.

FIG. 21 is partly a cross-section and partly a side view of an embodiment employing an alternate means of attachment of the present invention to a flat surface.

FIG. 22A is a first cross-sectional view showing an embodiment employing another alternate means of attachment to a flat surface.

FIG. 22B is a second cross-sectional view of the embodiment of FIG. 22A, further showing the means of attachment to a flat surface.

FIG. 23A is a diagram showing a geometry of the viewing angles for an object mounted on a flat surface.

FIG. 23B is a diagram showing a geometry of an increased viewing angle for an object mounted on a flat surface.

FIG. 23C is a diagram showing a modification of the geometry of FIG. 23A for the viewing angles of an object mounted on a flat surface.

DETAILED DESCRIPTION OF THE DRAWINGS

Various embodiments of the invention disclosed in my prior application of which this application forms a continuation-in-part and in my prior below-identified U.S. Patent will first be recited for completeness. Thereafter the specific embodiment which is the material of this patent will be described.

Figure 1:
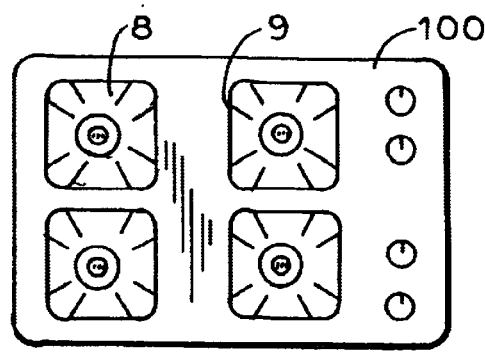
FIG. 1 is a top plan view of a gas stove having the device of the present invention on each burner.
Figure 2:
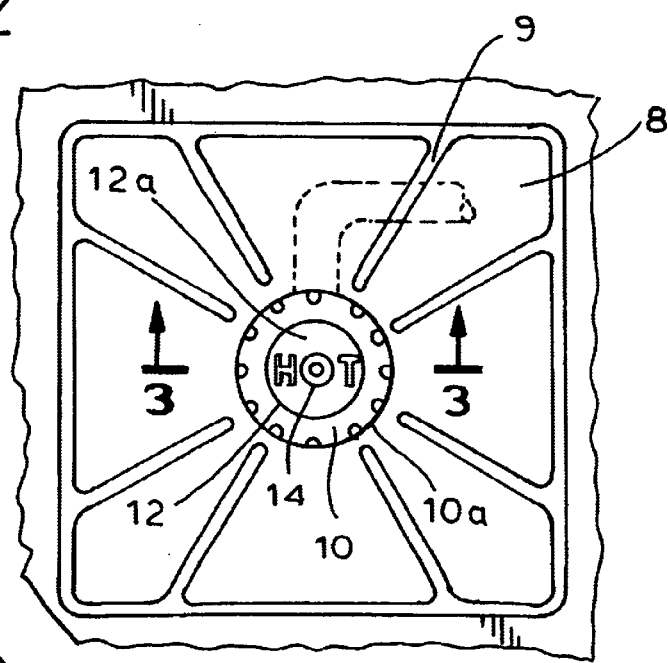
FIG. 2 is an enlarged fragmentary plan view of a heating element of a gas stove having the device of the present invention.
Figure 3:
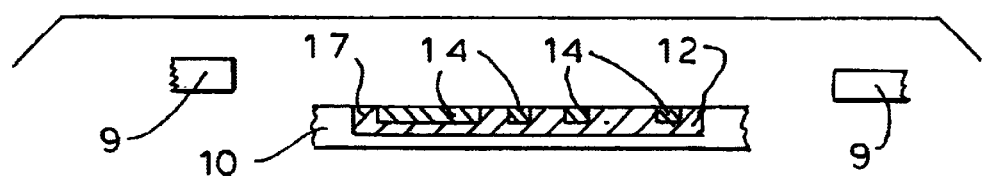
FIG. 3 is an enlarged fragmentary cross-sectional view taken along line 3—3 of FIG. 2.

One of the embodiments of the present invention, as described and claimed in my previous patent, U.S. Pat. No. 6,104,007, is for stoves that employ gas heat, as seen in FIGS. 1–3. In this embodiment, the top of the stove 100 typically has four heating elements 7, that are called burners and that are covered by metal grates 9, that are open in the middle. Each burner or heating element is situated in a recessed area 8 and is surrounded by the metal grate. As best seen in FIG. 2, there is a central metal element 10 in which a series of gas outlet holes on the side 10a of the central metal element permit gas to flow through and ignite. As seen in FIGS. 1–3, the central metal element 10 has a disk 12 on a top surface 12a of the central metal element 10 and this disk 12 contains thermochromic materials 14 in the form of the letters "HOT" that change color when they reach a certain temperature. Alternatively, the central metal element 10 itself can have embedded therein on its top surface the thermochromic material 14 in the shape of the letters "HOT" using known methods.

The temperature of the grates upon which pots and pans rest during cooking may be roughly equal or greater than the temperature of the central metal element 10. Accordingly, whenever the letters "HOT" become red both the grates and the central metal element may be too hot to touch. There may be some discrepancy between period of time needed for the grates to cool enough to be safely touched, and the period of time the central metal element 10 requires to cool enough to be safely touched. As an option to take into account any discrepancy between the time at which the central element 10 becomes cool and the time at which the metal grates become cool the temperature at which the thermochromic compositions 14 (such as cholesteric liquid crystals or various types of liquid crystal polymers designed to turn red at a specific temperature) turn red, the transition temperature, can be adjusted to a lower temperature, so that if either the grates or the central metal element 10 is too hot the thermochromic material 14 will remain red.

Figure 5:
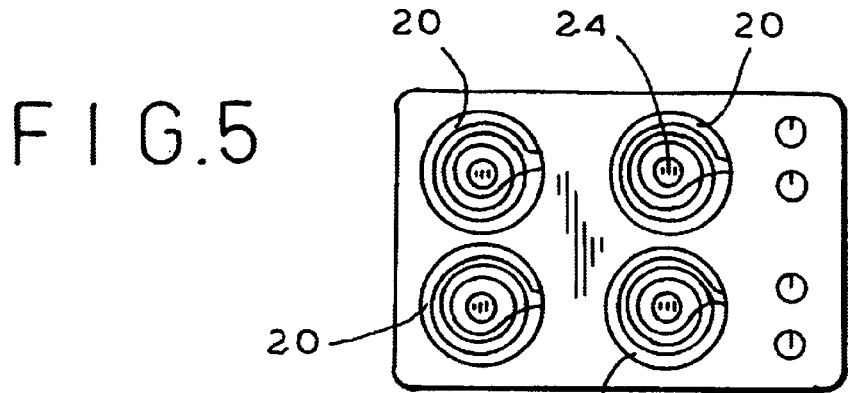
FIG. 5 is a top plan view of the device of the present invention used on an electric stove.
Figure 6:
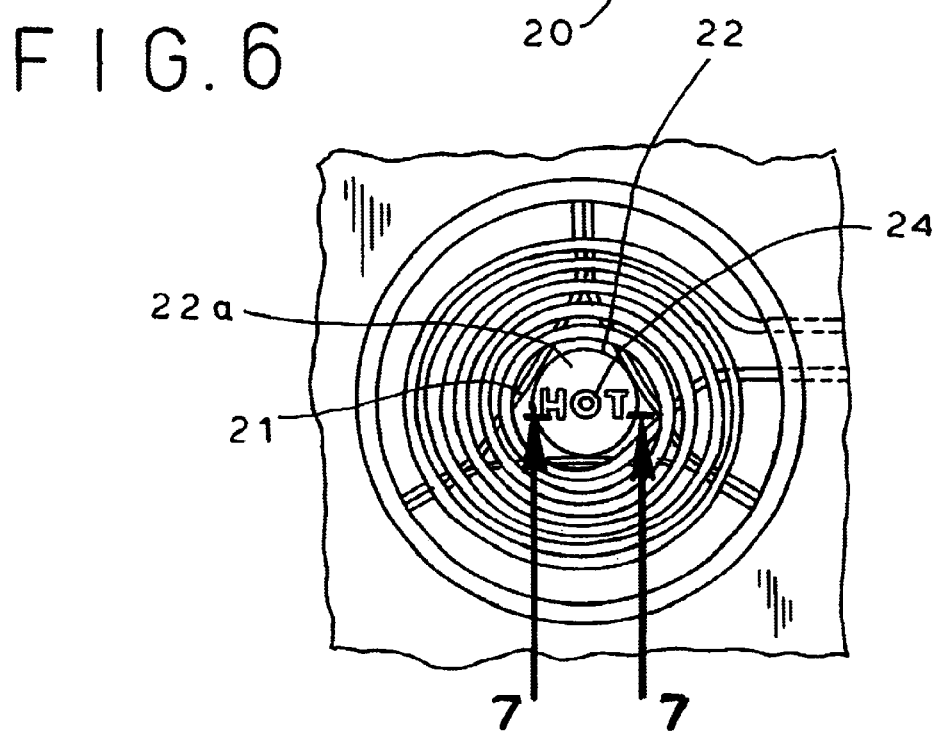
FIG. 6 is an enlarged fragmentary plan view of one heating element of an electric stove having the device of the present invention.
Figure 7:
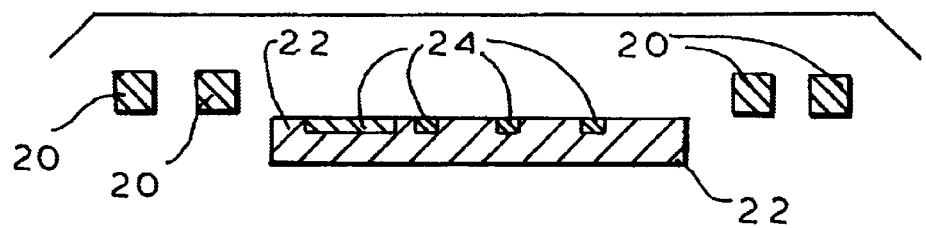
FIG. 7 is an enlarged fragmentary cross-sectional view taken along line 7—7 of FIG. 6.

FIGS. 5–7 depict an embodiment of the present invention described and claimed in my previous patent, U.S. Pat. No. 6,104,007, for the top surface of electric stoves. Electric stoves typically have four heating elements on the top of the stove made of electric coils 20 wound in a serpentine configuration and sitting on a metal rest 21. Normally, electric coils 20 have a recessed disk 22 in a central area of each coil 20 that is connected to and held up by the metal rest 21. FIGS. 5 shows top plan view and FIG. 6 shows an enlarged fragmentary plan view of electric coil 20 of the present invention having central disk 22 containing thermochromic composition 24 (which may be cholesteric liquid crystals or various types of thermochromic polymers designed to turn color at a specific temperature) that are in the shape of the letters "HOT" embedded on the top surface 22a thereof. The thermochromic material 24 become red whenever the temperature of central disk 22 exceeds 115 degrees Fahrenheit and remains red unless the temperature falls below this value. This heating element may be made by embedding the thermochromic material 24 on the top surface 22a of the central disk 22 using methods well known in the art. Alternatively, existing electric stove heating elements can be modified by fitting thereon a disk containing on its top surface thermochromic material 24 embedded therein.

The central disk 22 containing thermochromic material 24 in the shape of the letters "HOT" embedded on the top surface 22a is recessed roughly a quarter of an inch below the surface of the electric coil 20 so that when pans and pots are placed on the electric coils they do not scratch the central disk 22.

As an option, since there may be some discrepancy between the temperature of the electric coil 20 and that of the central disk 22, the transition temperature at which the thermochromic material 24 turn red, can be set to be the lower than the temperature requried to be safe to touch, so that when the thermochromic element reverts to its low temperature color the user may be sure the coils also are safe to touch. This way, someone is warned against touching either the central element 22 or the actual coil 20.

Figure 4:
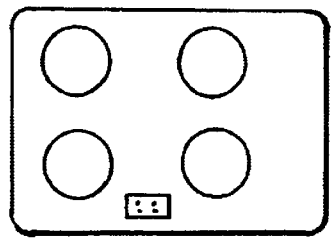
FIG. 4 is the prior art smooth cook top stove showing light indicators.

FIGS. 8–10 depict an embodiment of the present invention for use with smooth cooktop stoves, sometimes called "smoothtops" or "cooktops". For cook top stoves, the prior art is shown in FIG. 4. As seen in FIGS. 8–10, smooth cooktop stoves have heating elements that consist essentially of an area of glass surface 30 that is smooth on top and whose underside is made dark enough to absorb light. Such absorption generates heat in the smooth area of glass 30. Underneath each area 30, usually circular, is a strong light source 36, such as a halogen lights. The light source 36, as seen in FIG. 10, projects the light upward to the surface area of the smoothtop's heating element—the glass area 30 on the top surface of the stove. Since each glass area is coated on its bottom with a dark coating, when the light strikes the bottom of the glass areas the heat from the strong light is absorbed by the darkened portion of the smooth area of glass 30. These glass surfaces 30 form the heating elements of the stove. Cooking utensils are simply placed over the area (which may be square, round, etc.) of the heating element on the glass surface. Some smooth cooktop stoves employ "radiant" heat sources for the glass areas instead of halogen light sources 36 but the effect is the same. In addition, some smooth cooktop stoves have halogen lamps (under each area 30 as before) but they emit infrared waves that provide light and heat.

The heat alert device of the present invention when used for the smooth surface of cooktop stoves of either type would comprise thermochromic composition 32 embedded in the top surface of each glass area 30, which is the heating element on the smooth cooktop stove using known methods. For example, the thermochromic composition 32 may be made in the exact shape of the letters "HOT" by spraying the composition of thermochromic material 32 over each glass area 30 after covering the glass area 30 with a cardboard stencil or other cut-out in the outline or shape of the letters "HOT". As before, the liquid crystal or thermochromic composition is designed to turn red and remain red whenever the temperature of the smooth area of glass exceeds a specified temperature, such as 115 degrees Fahrenheit.

Figure 9A:
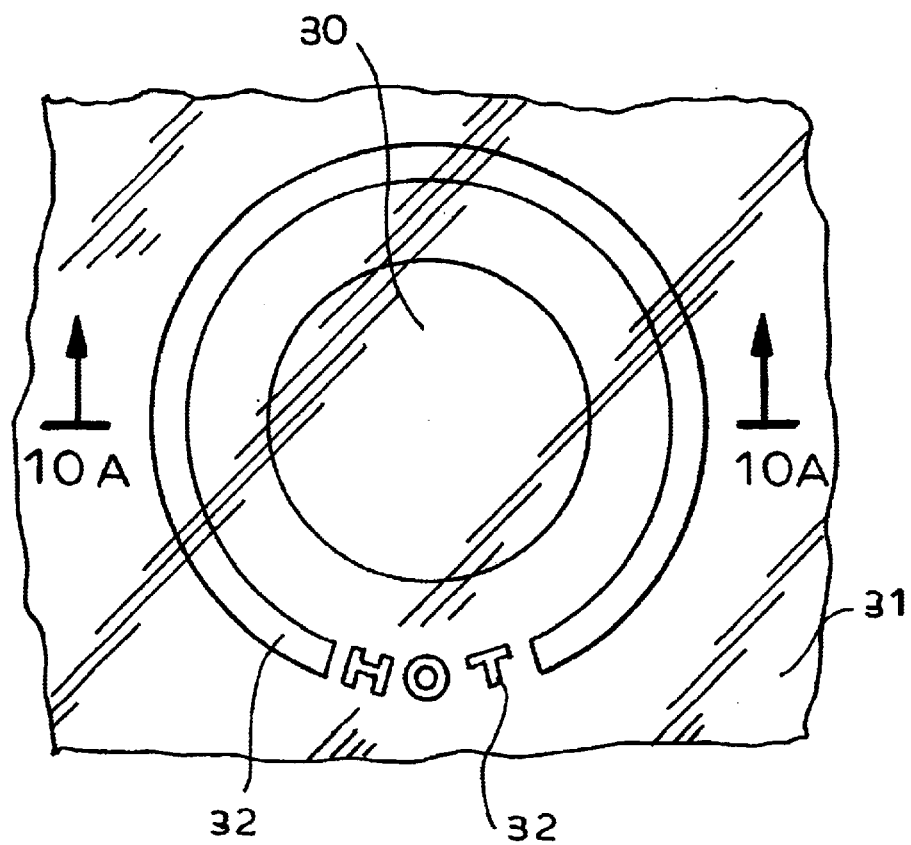
FIG. 9A is an enlarged fragmentary plan view of one heating element of a smooth cook top stove and having the device of the present invention in the shape of a ring surrounding the heating element.
Figure 10A:
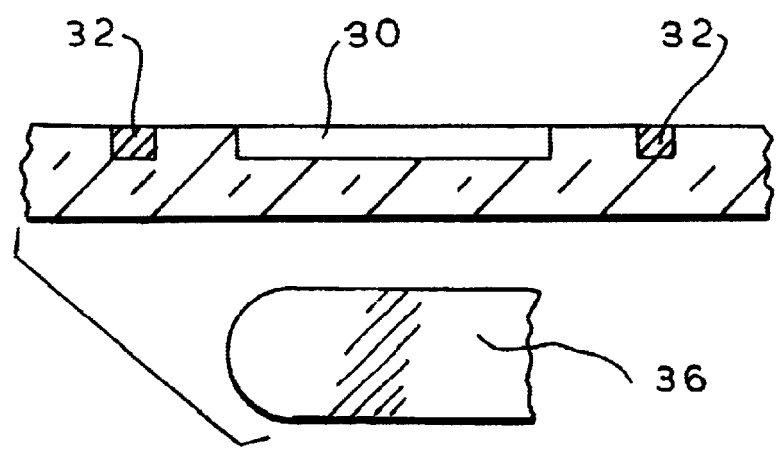
FIG. 10A is a enlarged fragmentary cross-sectional view taken along line 10A—10A of FIG. 9A.

As an alternative embodiment for smooth cooktop stoves, with such stoves using any technology including electric heating, electric induction and halogen light heating, the thermochromic display is in the shape of a ring surrounding the heating element (and visible when pots are placed on the heating element) which ring may have an interrupted area in the outline of the letters "HOT", as seen in FIGS. 9A and 10A. This addresses and solves the problem that people often leave pots or kettles on the stove perpetually and that with smooth cooktop stoves the result of doing so is that the heating element is no never visible (since the pot or kettle may be as large or large than the heating element). In such situations, no matter how mature, cautious and alert you are, you cannot readily ascertain that the heating element (and the kettle or pot above it) is too hot to touch. By seeing the ring of the present invention (with or without the letters "HOT" filling an interrupted portion thereof) lit up as red, you immediately know that the area of the heating element is too hot to touch. In this embodiment, the thermochromic composition 32 is embedded on the stove surface in the outline of a ring (and in the letters "HOT") in a location of surrounding the heating element, i.e. surrounding the top surface of the smooth glass or metal areas 30 on the stove surface 31.

Although FIGS. 8–10 (including FIGS. 9A, 10A) have been described in terms of smoothtops with heating elements made of smooth glass surfaces, other variations of smooth top stoves exist—in particular smooth metal tops called electric cooktops. The difference is that a light source 36 would not be used under the surface to generate heat—instead the metal gets hot by being connected to a heat source that may be electric (not shown). In addition, some smooth cooktops use a "ribbon heating element" instead of halogen light sources where the smooth glass surface is heated by a coiled electric circuit called a "ribbon element" directly and immediately underneath the glass instead of by a halogen light source. The device of the present invention works the same way for metal cooktops, glass cooktops and for those that rely on halogen light source as the heat or those that use ribbon heating elements. FIGS. 8–9 which depicts the present invention for use with glass cooktops also depicts the present invention as applied to smooth metal cooktop stoves and as applied to ribbon heating elements. FIG. 10, which describes the present invention for use with glass cooktops that employ halogen light sources, the top part of FIG. 10 also depicts a cross section of the thermochromic composition for smoothtops—for metal cooktops and glass cooktops using ribbon heating elements the halogen light source 36 would not be present but everything else would be the same. For all of the smooth cooktops, the thermochromic composition 32 would still be embedded in the top surface of the smooth metal areas 30 on the stove surface in the shape of the letters "HOT".

Other variations of smooth cooktops also exist and the thermochromic composition in the shape of the letters "HOT" can also be embedded in their surfaces. For example, some smooth cooktops have a raised solid element having a smooth top and made of metal having a recessed central area. The thermochromic composition would be embedded in this recessed central area as before in the shape of the letters "HOT".

FIGS. 11–13 depict a wall oven whose window surface 40 has embedded thereon the thermochromic composition 46 of the present invention in the shape of the letters "HOT". As before, the thermochromic composition 46 is designed to turn red and remain red whenever the temperature of the smooth area of glass exceeds a specified temperature, such as 115 degrees Fahrenheit. The purpose is to warn children or adults not to touch the surface of the window 40 that gets very hot when the oven is on. There is not present a convenient and effective warning method in use for the vertical surfaces of oven windows. This is particularly important since when the oven is turned off, the window 40 remains hot even though it appears that everything is off.

Toaster ovens also have a window surface 40 which would have embedded thereon the thermochromic composition 46 of the present invention in the shape of the letters "HOT". As before, the thermochromic composition 46 is designed to turn red and remain red whenever the temperature of the smooth area of glass exceeds a specified temperature, such as 115 degrees Fahrenheit.

Hot plates can be thought of as small mobile electric stoves having one heating element. Warming trays can be thought of as small mobile smooth cooktop ovens having one smooth surface as a heating element. In both of these cases, the hot plate and the warming tray, the present invention would be applied to the heating element and function the same way as described with respect to their larger and more permanent counterparts—the electric stove and the cooktop stove.

It should be noted in general that the present invention makes use of any thermochromic composition that changes color and remains at that color when a specified temperature is reached or exceeded—it need not necessarily be cholesteric, although it has been found that cholesteric liquid crystal material does this effectively. It is also within the scope of the present invention to make use of a thermochromic composition that changed color when it reached a specified temperature or temperature range but changed to a third color at a higher threshold temperature, so long as the third color is significantly different from the first color—although this would certainly not be the ideal kind of thermochromic composition. The ideal composition turns red at a specified temperature and remains red above that temperature.

With use of the present invention, when an individual enters the kitchen with the cook top stove in it he or she can instantly recognize if any of the heating elements are too hot. This is in contrast to the prior art for which the person would have to first figure out which heating element corresponds to which light indicator.

The present invention contemplates that other letters and other letter shapes besides that of "HOT" could be used as a warning although it is believed that the simple arrangement of the letters "HOT" in a bold simple typeset provide the best warning. Furthermore, the present invention also contemplates that the thermochromic composition in the outline of the letters "HOT" can be embedded in a surface of a stove, toaster oven or other appliance where the surface is vertical and perpendicular to the floor, not only horizontal. In addition, while the drawings depict the thermochromic composition embedded on the surface of the stove in a particular configuration and depth, it is contemplated by the present invention that the depth and configuration of the thermochromic composition can vary and still be within the scope of this invention.

It is also contemplated by the present invention that glass disks containing thermochromic compositions in the shape of the letters "HOT" can be made so as to be purchased separately by the consumer as a glass disk having embedded therein the thermochromic composition to be affixed to a glass surface area of a cooktop stove, a wall oven or a toaster oven.

It is also contemplated by the present invention with respect to all embodiments that in addition to the thermochromic composition being in an outline of the letters "HOT", the thermochromic composition could instead be in the background of such an outline. By this is meant that the thermochromic composition would form the entire area except an outline of the letters "HOT". The point of one feature of the present invention is to use the thermochromic composition to create a color contrast between red and some other color in order to depict the letters "HOT" in red whether by virtue of the thermochromic composition itself being the letters "HOT" or whether the thermochromic composition surrounds the letters and in effect constitutes everything else except the letters "HOT". Furthermore, it should be noted that in this patent application, the term "red" refers to all possible variations and shades of the color red as well as to all possible variations of the colors orange and yellow. Red and orange and yellow are the colors associated with heat. Furthermore, if the hot surface (as opposed to the area of the thermochromic composition) itself is or becomes red when hot, then the thermochromic composition 230 would have to be orange and vice versa.

Hot Button Embodiment

The "hot-button" or "mushroom" embodiment of the invention is now discussed. This embodiment provides a detachable device which may be applied to existing surfaces, and is designed to be visible through a wide and optionally selectable angle of view.

In order to be effective, a warning must be visible. Furthermore, in order to be processed quickly by the human brain, a warning must be clearly visible, a condition which for the purposes of this patent shall be deemed "substantially visible", which condition will be precisely defined.

As a preliminary, FIGS. 23A, 23B, 23C illustrate geometrical concepts mentioned in the specification. A smooth surface S has an abstract normal or perpendicular line N, as shown in FIG. 22A. In general a circularly symmetric warning device affixed to surface S (not shown) will be usefully visible through a cone or solid angle C defined by an angle α. When an object is said to be "substantially visible through an angle α with the normal", it will mean in terms of an angle α so defined. An object or symbol will further said to be "substantially visible through an angle α with the normal" when it is visible in at least one direction of tilt from the normal through this angle, that is, in at least one half plane. The cone of visibility need not in fact be a circular cone, although it may be. If the maximum angle of visibility is not constant with rotation about a normal axis to the surface, it will be taken as the largest such value.

The precise meaning of "substantially visible" will now be defined. To allow enough reaction time to avoid touching a hot surface an individual must be able to readily perceive a warning from at just outside of arm's length: the minimum warning distance is taken as three feet. To be usefully visible to a person of near normal visual acuity at a distance of three feet a symbol and its background must subtend a minimum viewing area in the line-of-sight: this minimum viewing area is taken as ¼" by ¼" (at least ¼" in each dimension). By "subtend" it is meant that the viewing area of the object or symbol—and immediate background—is projected on a surface perpendicular to the line-of-sight. This is geometrically illustrated by the relation of a length of line segment P in FIG. 26 to the visible dimension of face 744 of cap 740.

Furthermore, "substantially visible" limits the angle of incidence of the line of sight with the surface on which a symbol is represented. The "angle of incidence of the line of sight with the surface" is just the same angle a as defined in FIG. 23A. The reason for this limitation is that the "specular" or mirror reflectance of almost all materials increases with the angle of incidence of light; that is, materials act more like mirrors at large angles of sight to the vertical (small angles of sight with respect to the surface). This increasing mirror reflectance tends to swamp the contrast of a displayed symbol, especially one lit by ambient lighting, as the viewing angle increases.

For the purposes of this invention it is judged that a portion of a surface displaying a symbol is not usefully visible if the viewing angle or line-of-sight exceeds 70° from the vertical. That is, to be "substantially visible" from a given angle, portions of a surface displaying a symbol or at least contributing to the required ¼" by ¼" subtended area, must have a normal at no more than 70° to the line of sight.

By way of illustration, a 1" by 1" flat display, viewed at an angle of 60° to the normal, would subtend an apparent area of 1" by ½". In that example, as best appreciated from looking at FIG. 26, in one dimension the range of vision is decreased by 50% because the cosine of 60° is ½. The other dimension is unaffected so the area is 1" by ½". Since 1" by ½" exceeds ¼" by ¼", and since 60° is less than 70°, this display is judged to meet both requirements, and be "substantially visible" from this viewing angle, or line-of-sight.

If the same display is viewed from an angle 80° to the normal, the apparent area subtended is now approximately 1" by 0.19". Since 0.19 is less than 0.25, or ¼, the display fails to be substantially visible from this angle on this criterion, even though the total area subtended is greater than ¼" times ¼", or approximately 0.06 square inch. Furthermore, even if the overall display sized were increased to 2" by 2", so that the apparent viewed area were 2" by 0.38", this display would be deemed not substantially visible at this angle, since 80° is greater than 70°. These concepts will subsequently be developed further in relation to FIGS. 24, 25 and 26.

FIGS. 15 through 20 depict several alternative shapes for a versatile heat alert safety device 200 of the present invention. The versatile heat alert safety device of the present invention is designed to address many of the needs outlined, including the need for a device that can be attached to a hot surface and later removed and re-attached either to a different hot surface or a different part of the same hot surface, one that is rugged, suitable for temperatures of 500° F. or greater, and is viewable from a wide range of angles. The hot surfaces are typically metal or glass but can be of other suitable materials.

In each of the shapes shown in FIGS. 15–20, the device is essentially comprised of two parts, an attachment part and a container part having the thermochromic composition, each of which is adjacent to the other. In some cases, the parts are attached like a dime affixed adhesively to the back of a half-dollar (of U.S. currency). It should be noted that for the embodiments depicted in FIGS. 15–20 the overall device of the present invention has been assigned the reference numeral "200".

Figure 15A:
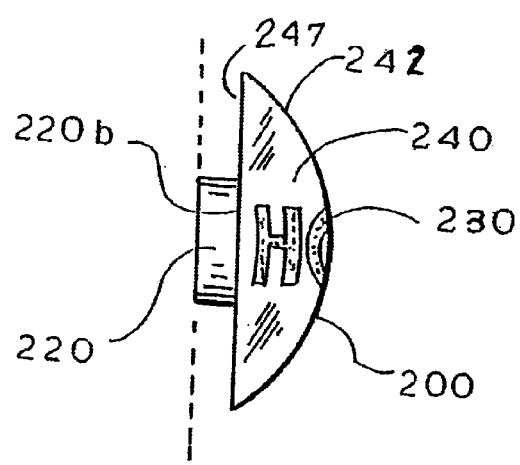
FIG. 15A is a side view of an alternative embodiment of the device of the present invention.
Figure 15B:
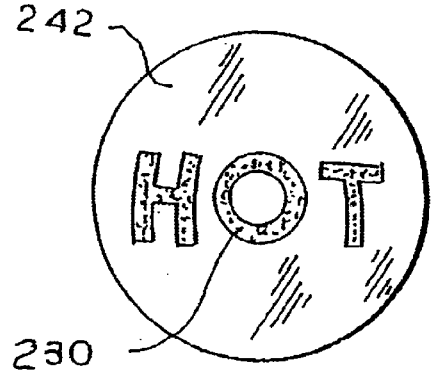
FIG. 15B is a front view of an alternative embodiment of the device of the present invention.

As seen in FIGS. 15A and 15B, the first part of device 200 is the attachment element 220 that is a thin disk that may be round or square. Attachment element 220, which is attached to the metal or glass surface (not shown), conducts heat. Attachment element 220 may be either a magnet or else a thermally conductive but non-magnetic material. This may be a traditional material such as aluminum, or a more modern material such as an electrically conductive plastic. Electrically conductive plastics are also good thermal conductors. Such non-magnetic attachment elements would also either have adhering characteristics so that device 200 that are sufficiently strong to adhere the device 200 to the hot surface but sufficiently weak so that the device 200 can be removed from and hence be removably attached to the hot surface. Alternatively, the heat conducting plastic would have a layer of weakly adhering plastic of any kind at a rear surface that comes into contact with the hot metal, glass or other surface. Plastics made of polymers that conduct electricity and transmit heat are known to organic chemists. This attachment element 220 makes the device 200 removably attachable to virtually any hot surface.

Figure 15C:
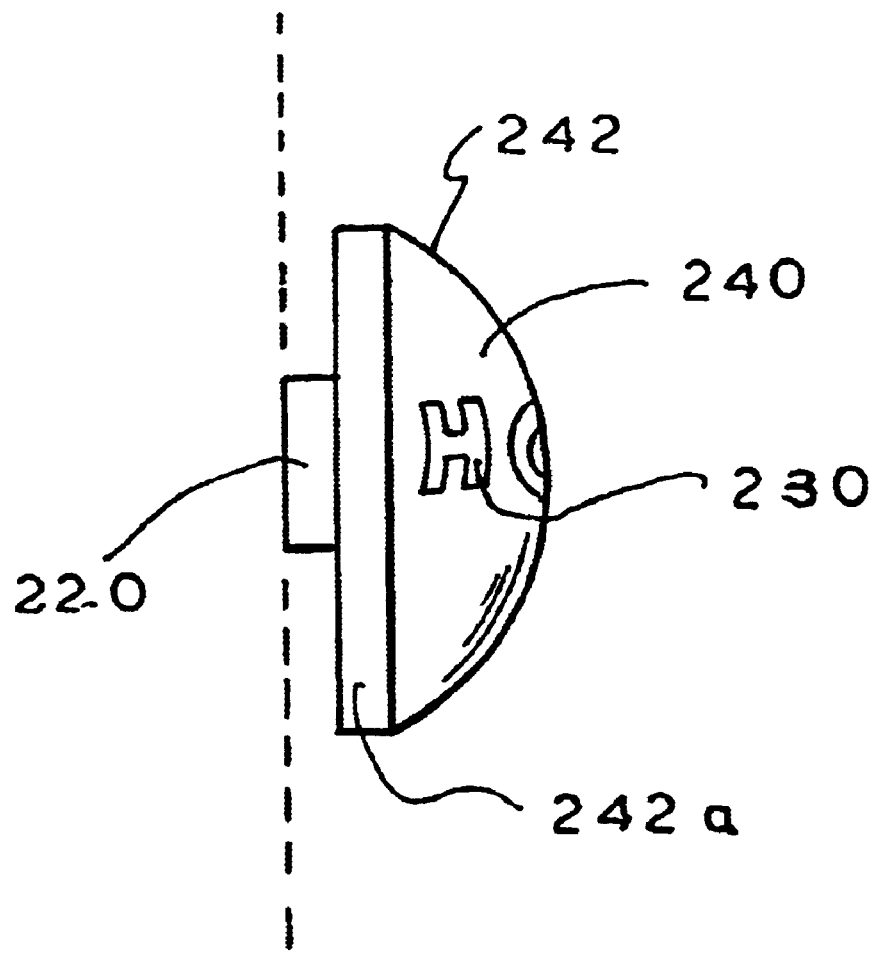
FIG. 15C is a side view of the device of FIG. 15A except showing an alternative embodiment of the device of the present invention.

The second part of device 200 is composed of the thermochromic composition 230 itself and a container 240 for containing these crystals 230. In all embodiments of the present invention, the container element of the device has a face that is convex that overlies the thermochromic composition 230 and that is transparent in at least a portion of the container overlying the thermochromic composition 230. Technically, it is only the uppermost part of convex face 242 that need be convex. Hence, as seen in FIG. 15C, container 240 may also have a generally planar and substantially cylindrical sub-face 242a below convex face 242.

Ideally, curved face 242 of container 240 is convex and curved although typically not rounded to the extent of being a hemisphere since if the container 240 had too much of a height it would limit the range of angles from which the letters "HOT" on curved face 242 can be seen completely. Alternatively, container 240 may be extended to a complete hemisphere or beyond, without sacrificing legibility, if the letters "HOT" or some other warning symbol is repeated in a pattern (not shown) on face 242, so that a recognizable portion of the pattern is visible from a wide range of angles.

In all embodiments of the present invention except the "mushroom" embodiment (see e.g. FIGS. 16A, 16B) where the st, attachment element 220 is preferably thin enough so that the shape of the container 240 and the attachment element 220 together resembles an outer shape of a campaign button.

As an illustration of the geometry of a spherical cap or button, FIG. 15A may further serve as a reference. The term "button" means something resembling, in shape and size, the visible side of a campaign button. If container 240 is in a shape of a cap or section cut from a sphere (not shown) with diameter D, then the container will have a minor diameter d equal to the diameter of flat container attachment side 247. The container will also have a thickness h as seen from the side (FIG. 15A) equal to a perpendicular distance from side 247 to an extreme point 232 of curved face 242. This thickness h is the minimum thickness which will allow proper visibility in a line of sight just grazing the protected surface.

The diameter of the hot button 200 of the present invention is represented by flat container attachment side 220a. This diameter should be such that the thickness h as measured from perpendicular distance from side 220a to the farthest point 232 along curved face 242 provides a side view of the hot button that allows someone from a distance of say 3 feet to see one or more letters of the message on thermochromic composition 232. The diameter should not be so great that the hot button 200 is too bulky or occupies too much of the surface area of an object.

By way of particular example, suppose a person of normal visual acuity will clearly see a letter of 5/16 inch in width from a distance of 3 feet, which is at or beyond arm's length. Then the width of 5/16 for the hot button 200 can be achieved by having the hot button of various diameters depending upon the degree of curvature of the convex curved face 242. If container 240 of the hot button 200 was to be a perfect hemisphere, the diameter of container 240 should be five-eighths of an inch in order to ensure that thickness h in inches of container 240 is 5/16. Actually, however, curvature of container 240 is flatter than a perfect hemisphere since hot button 200 resembles the outer surface of a campaign button.

Accordingly, the width of 5/16 for the hot button 200 will be achieved approximately by cutting a cap with minor diameter d=2 and two-thirds inches from a sphere of radius R=3". The cap will then be approximately 2 and two-thirds inches in diameter and approximately 5/16" in thickness. Other combinations of minor and major diameters in the cap and sphere exist such that the cap would have a thickness of approximately 5/16". Since as seen in the FIG. 15A at least one letter of even a single instance of "HOT" will be visible from the side, this will suffice to convey the warning.

In these preceding examples, it will be understood that "cut" does not literally mean that a piece must be cut from a complete sphere of material to manufacture a spherical cap.

Alternatively, and less ideally, straight face 242a of container 340 may be used, as seen in FIG. 20A. In this instance, warning symbols 342 are optionally formed by thermochromic material embedded in a rim or outer circumference 344 of container 340. Container 240 is also somewhat disk shaped in that it has a flat rear edge 247 (like the flat side of a hemisphere) that attaches to the flat container attachment side 220b of the attachment element 220. Typically, although not necessarily, container 240 has a larger diameter than the diameter of the attachment element 220 because the diameter of container 240 should reflect the fact that it is desirable that the letters "HOT" on curved face 242 be widely visible while the diameter of attachment element 220 need only be large enough to yield a secure attachment of device 200 to the hot surface.

Container 240 is made of a heat transmitting or conducting substance capable of being transparent such as any of a variety of heat conducting glassware products sold under the name "Pyrex" or any heat transmitting plastic that is capable of being transparent. Curved face 242 of container 240 is transparent at least in the portion of curved face 242 that covers the thermochromic composition 230. Accordingly, curved face 242 displays the letters "HOT" when the surface to which the heat transmission element 220 is attached exceeds a specified temperature, for example a temperature above approximately 115 degrees Fahrenheit (° F.).

The attachment element 220 of device 200 has a flat container attachment side 220b that is attached to the flat rear edge 247 of the container 240 by a variety of means, such as by epoxy or by being welded if the heat attachment element is 220 is a magnet. The epoxy should of course not be so extensive that it impedes the heat transmission between the two parts of device 200.

Figure 16A:
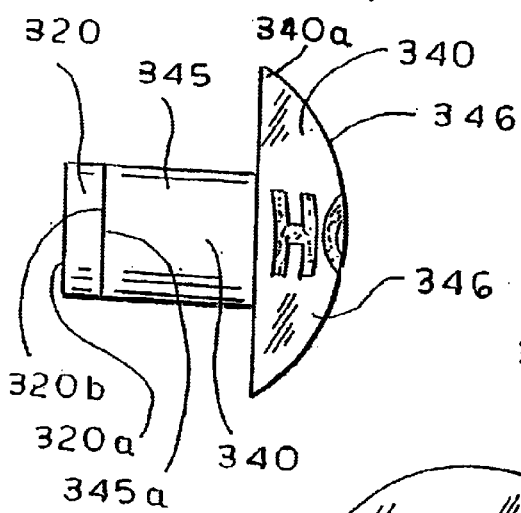
FIG. 16A is a side view of an alternative embodiment of the device of the present invention.
Figure 16B:
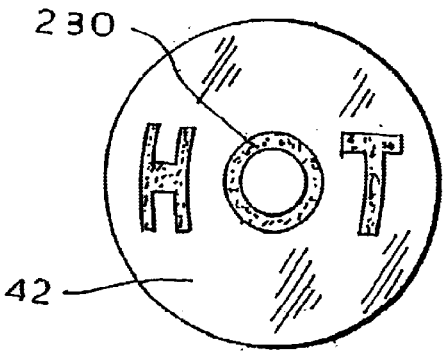
FIG. 16B is a front view of an alternative embodiment of the device of the present invention.

As seen in FIGS. 16A and 16B, an alternative shape of device 200 includes what is called a mushroom shaped container 340 composed of a stem 345 and a convex face 346. Although stem 345 typically is of the same material and forms an integral part of the rest of container 340 and hence is usually described as forming of a portion of container 340 with the non-stem portion of container 340 being called a container head 340a for convenience, for the purpose of illustrating the shape of the overall device in the mushroom embodiment and comparing it to other embodiments it is also convenient to describe stem 345 as separate from container 340 and as being mounted between container 340 and attachment element 320. Stem 345 is made of heat conducting material and designed to offset the container head 340a of container 340 from attachment element 320 and hence also from the hot surface that the hot button device is on. The overall device is substantially in the form of a mushroom. Typically, and this is why it is referred to herein as "mushroom shaped", stem 345 is narrower in diameter than convex face 346 although it need not be, because convex face 346 has to be visible whereas stem 345 need only be wide enough for device 200 to be secure for attachment to the hot metal or glass surface by means of attachment element 320. Convex face 346 of container 340 houses the thermochromic composition 230 and is transparent at least in a portion of the face 346 that covers the thermochromic composition 230. Alternatively, and less ideally, straight face 346b of container 340b may be used, as seen in FIG. 20B.

As in the shape shown in FIG. 15A and 15B, container 340 in FIGS. 16A and 16B is made of a heat conductive material. Unlike in FIGS. 15A and 15B, in FIGS. 16A and 16B container 340 has a short cylindrical stem 345 including a rear stem edge 345a and has a convex face 346 that is curved although typically not as much as a hemisphere. The thermochromic composition 230 is shaped in an outline of the letters "HOT" or in the background of such an outline.

Thermochromic composition 230 is embedded in the convex face 346 of the container 340 and is designed to turn red and remain red whenever the temperature of the hot surface exceeds a specified temperature.

Device 200 shown in FIGS. 16A, 16B, as with device 200 shown in FIG. 15, includes attachment element 320 that is made of a heat conductive material and has a hot surface attachment side 320a and a container attachment side 320b. Attachment element 320 is removable from and attachable to the metal or glass surface on the hot surface attachment side 320a. The rear stem edge 345a on container 340 is flat and attaches to the flat edge of container attachment side 320b of the attachment element 320.

As in FIGS. 15A and 15B, in FIGS. 16A and 16B, device 200 includes container 340 that is either a solid piece of heat transmitting plastic or any of a variety of transparent heat transmitting glassware such as that sold under the name "Pyrex". Likewise, convex face 346 displays the letters "HOT" when the surface to which the heat transmission element 320 is attached is at a specified temperature, such as a temperature above approximately 115 degrees Fahrenheit. Rear stem edge 345a of container 340 attaches to either a magnet 320, which since it is metal transmits heat and is removably attachable to a hot metal or glass surface, or else it attaches to a detachable adhering plastic that also transmits heat and whose adhesive strength is sufficiently weak that it is detachable yet sufficiently strong that it can adhere an object of a decent amount of weight to a smooth metal or glass (or other suitable) surface. An example of a heat transmitting plastic is polyacetylene. 3M, the well known company in Minnesota, manufactures and sells adhesives that are used for temporarily attaching objects that have significant weight to a surface.

Figure 17:
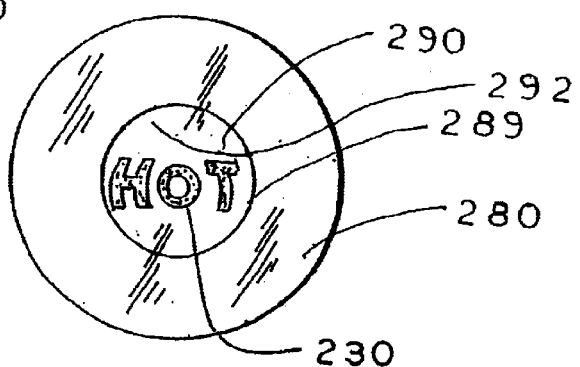
FIG. 17 is a front view of an alternative embodiment of the device of the present invention.

As seen in FIG. 17, another alternative shape of device 200 is shown. In this embodiment there is an inner cylinder container 290, in the shape of the hole of a doughnut, for housing the thermochromic composition 230. Face 292 of inner cylinder container 290 ideally should be convex for better viewing of the letters "HOT" (although face 292 could less ideally also be straight and not convex) and is transparent at least in a portion of face 292 covering the thermochromic composition 230. Inner cylinder container 290 is made of a heat conductive material capable of being transparent. As in FIGS. 15A, 15B, 16A, 16B, in FIG. 17 the thermochromic composition 230 is designed to turn red and remain red whenever the temperature of the hot surface exceeds a specified temperature. In this shape shown in FIG. 17, there is an outer cylinder attachment element 280 made of a heat conductive material and in the shape of a doughnut having a flat rear wall (not shown) for attaching to the hot metal or glass surface. The inside wall 289 of the outer cylinder attachment element 280 is attachable to the inner cylinder container 290 and the flat rear wall (not shown) of attachment element 280 allows removable attachment of device 200 to a hot surface. Inner cylinder container 290 is also flat on its inner cylinder container rear wall (not shown) and the inner cylinder container rear wall (not shown) is typically flush with the flat rear wall (not shown) of attachment element 280 in order to not impede the smooth attachment of device 200 to a hot surface.

Each of the embodiments of device 200 depicted in FIGS. 15 through 20 are versatile heat alert safety devices in that they are readily attachable to and later detachable from any surface that may be hot even after the source of the heat has been shut off. Such surfaces can include metal or glass and may include the metal or glass wall of any heat-producing appliance such as the wall of an electric stove, gas stove, smoothtop stove, oven, toaster or a metal crock pot. The hot surfaces to which device 200 can be attached need not be restricted to metal or glass but can be other surfaces that can receive a magnet or temporarily adhering adhesives.

Two or more sides or walls of an appliance can sometimes get hot and the one side might not be suitable to have a heat alert safety device attached to it even though the same heat alert safety device of the present invention is made specifically for the other side of the same appliance. For example, a heat alert safety device of the present invention for the top of an electric stove is not suitable for attachment to a side wall of that stove. Device 200 as depicted in FIGS. 15A, 15B, FIG. 16A, FIG. 16B, FIG. 17, FIG. 19 and FIG. 20 can be applied to any wall of such an appliance since it can be applied to any hot surface. This application is especially useful for kitchen workers surrounded by multiple ovens and/or hot counters—they can place device 200 on each such hot surface.

Other surfaces that get hot and to which device 200 can be usefully applied besides food related appliances include radiator caps located under the hood of a car or other vehicle, piping through which hot steam flows, the surface of a curling iron, surfaces of a steam press and many others listed herein in the Objects and Advantages.

Accordingly, FIG. 18A shows a heat alert safety device 200 designed specifically to be removably attachable to a rounded metal, glass or other hot surface, such as piping, that may be hot. In this embodiment, the heat alert safety device 200 may be of the same shape as the device 200 of FIG. 16 (or alternatively FIG. 15) except with respect to the shape of attachment element 420 of the device 200 of FIG. 18. Since the device 200 shown in FIG. 18 needs to be attached to a rounded surface such as a pipe, the container 440 for housing the thermochromic composition 230 has a short cylindrical stem 445 including a flat rear stem edge 445a and container 440 has a convex face 446. Attachment element 420 has a concave hot surface attachment side 420a and a flat container attachment side 420, attachment element 420 is removable from and attachable to the rounded hot surface on the hot surface attachment side 420a so as to allow the letters "HOT" to be visible. Flat rear stem edge 445a attaches to the container attachment side 420b of attachment element 420. Alternatively and less ideally, as seen in FIG. 18B, the concavity can also exist at the rear stem edge 445a and at the container attachment side 420b of attachment element 420 (with identical curvature).

Another feature of the present invention that enhances its versatility is that device 200 can be positioned at a height suitable for a small child and can be repositioned later at a different height when the child is older and taller. In a family of many children of different ages and heights there would typically not be room on the walls of an appliance for several different heat alert safety devices of the present invention. With the device 200 depicted in FIGS. 15–16, curved face 242 of FIG. 15 and convex face 346 of FIG. 16 are convex or rounded so that the letters "HOT" thereon may be read from a variety of angles, depending upon the height (and angle of observation) of the observer.

Another way in which the device 200 of the present invention can be read from a variety of angles is that in one embodiment of device 200 its angle of placement with respect to the observer is adjustable. Device 200 can be positioned at different angles from the viewer to maximize the potential for observers, particularly children, to be able to read the letters "HOT". This is especially valuable when the heat alert device 200 is affixed to difficult to access surfaces that may be hard to notice. It is critical that children actually be able to read the letters "HOT" for the device to be effective.

In the embodiment shown in FIG. 19, a device 200 has a convex cap 502 which can be tiltably adjusted to present convex face 522 to various viewing angles. The angle of the cap 502 may be chosen so that the child to be warned of the hot surface can most easily read the letters "HOT" on convex face 522. At the edge at which stem 545 meets convex face 522 of container 540, well known rotation attachment means (not shown) allows rotation of the convex face 522 with resistance through a discrete number of indent or stop positions. Convex face 522 can also continuously rotate on a frictional fit with stem 545, on threading exiting on stem 545 or by means of other well known rotation attachment techniques, such as a ball and socket joint. As a result of such rotation, the angle that convex face 522 makes with the hot surface 599 can be adjusted to suit the height of the intended observer.

Although FIG. 19 has been presented with device being in the shape shown in FIG. 16A, the embodiment of FIG. 19 can also accommodate others overall shapes of device 500, such as that shown at designation 200 in FIG. 15.

In an alternate embodiment shown in FIG. 21, clear convex cap 600 is affixed to permanent magnet 602. Permanent magnet 602 is attracted to a keeper element 604 positioned on an opposite side of a non-ferromagnetic panel, such as a glass oven door 606.

Another alternate embodiment showing an additional means of attachment to a smooth surface is shown in FIGS. 22A, 22B, in a device generally labeled 605. The well known principle of a suction-cup is applied. Flexible heat resistant elastomer 608 is shown in an undeformed position in FIG. 22A. It is to be understood that this figure is symmetric with respect to rotation, so that the elastomer forms a circular disk. Inserted through a center of the disk and permanently bonded to it is a heat conductive stem element 610, which is further bonded to a clear convex cap 612. In FIG. 22B, the elastomer 608 is shown in a deformed position following a pressing of the assembly 601 against a smooth surface 614 by a user. As is generally understood, deformation of the elastomer results in a partial vacuum formed in void space V defined by the elastomeric disk and surface 614. This partial vacuum holds assembly 601 and in particular stem 610 tightly against surface 614, forming a good thermal contact.

It will be understood that the various methods of attachment may be combined. The stem element of FIG. 22A may also be a permanent magnet, and may optionally be provided with a keeper element, as shown in FIG. 21. Thereby the power of the suction cup may be augmented both for ferromagnetic and non-magnetic surfaces. In other embodiments (not shown) the invention will have a protrusion from the stem, such as a threaded bolt end, passing through a penetration of a sheet of material having a potentially hot surface, and engaging a fastener on a far side of such material, such as a nut and lock washer. In yet other embodiments such a protrusion may engage a permanently mounted spring clip or fixture on an appliance, such that the hot warning button is readily repositionable or replaceable.

As mentioned previously, FIGS. 23A, 23B, 23C illustrate geometrical concepts mentioned in the specification. A smooth surface S has an abstract normal or perpendicular line N, as shown in FIG. 22A. In general a circularly symmetric warning device affixed to surface S (not shown) will usefully visible through a cone or solid angle C defined by an angle α. To increase the useful range of visibility a device may be modified optically to be visible through a larger angle α', as shown in FIG. 22B, and such as is achieved by the surface convexity of the embodiments of FIGS. 15A–9, 21–22B. To enhance visibility in a given direction, the device may be mounted at a tilt with respect to the surface normal N as defined by axis T and angle β, as shown in FIG. 23C, and realized by the adjustably tiltable embodiment of FIG. 19. The improvements shown in FIGS. 23B and 23C can be combined in one device, as also illustrated by the embodiment of FIG. 19. Furthermore, the tiltable joint of the embodiment of FIG. 19 may be combined with any of the remaining embodiments of the invention. For example, by insertion of a stem between permanent magnet 602 and convex cap 600 in the embodiment of FIG. 21 sufficient clearance may be gained to insert a tiltable joint in accordance with the embodiment of FIG. 19.

Figure 24:
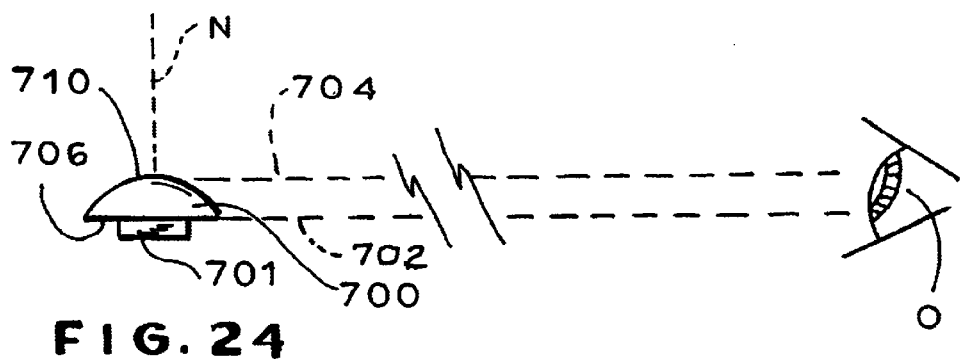
FIG. 24 is a schematic view showing a line-of-sight in a first geometry of the present invention.
Figure 25:
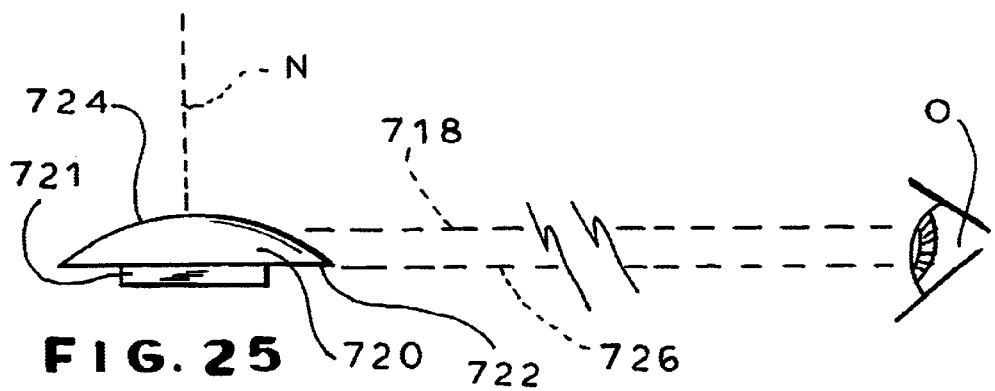
FIG. 25 is a schematic view showing a line-of-sight in a second geometry of the present invention.
Figure 26:
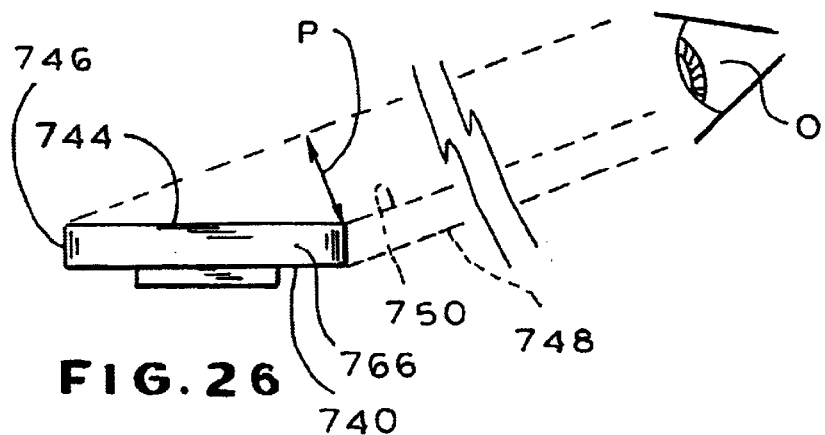
FIG. 26 is a schematic view showing a line-of-sight in a third geometry of the present invention.

FIGS. 24, 25, and 26 show critical lines-of-sight in establishing substantial visibility of the display of three different geometric embodiments, to illustrate the principles involved.

FIG. 24 shows a rivet-shaped embodiment with an approximately spherical or slightly paraboloid convex cap 700 of major diameter of approximate 1⅛" at the apex, where the cap is intersected by a central normal line N, and mounted on a stem or attachment pieces 701. (A paraboloid is a solid figure formed by rotating a parabola about its axis of symmetry. Significantly with respect to the present invention a paraboloid has the property that it does not have a constant radius of curvature, but becomes flatter away from the apex). Broken lines 702, 704 define the boundaries of a grazing line of sight of an observer O. The lines are defined as follows: line 702 is aligned with a lower face 706 of cap 700, whereas line 704 is defined by geometric construction as parallel to line 702, and intersecting a surface 710 of the cap 700 at an angle γ of 70°, which is considered the angular limit of useful visibility of a surface display. Therefore all lines parallel to and lying between lines 702 and 704 intersect the surface of the cap at angles less than 70°. Further the perpendicular distance between lines 702 and 704 is found to be approximately ⁵⁄₁₆", or greater than ¼". Therefore the surface of cap 700 meets these two conditions for substantial visibility, as previously defined, at a grazing line-of-sight. The surface also necessarily meets these two conditions for substantial visibility at a normal line of sight (not shown), parallel to line N, and at all lines of sight lying between the normal line of sight and the grazing line of sight.

Therefore a pattern or indication (not shown) on the surface of cap 700 is potentially substantially visible through a complete hemispherical solid angle of 180°, or angle of incidence of 90°, improving the visibility over flat displays of the prior art, which are invisible at or near grazing angles of sight.

A similar construction is shown for a shallower cap 720 in FIG. 25, mounted on a stem 721. The cap 720 is a section of a sphere of major radius 3", and a rear face 722 of diameter 2". Line N is again shown as a central normal to surface 724 of cap 720, and a construction similar to that of FIG. 24 is made for an observer O at a grazing line-of-sight. It is found once again that a width between lines 726 and 728 is approximately ⁵⁄₁₆", and that therefore the above mentioned conditions for substantial visibility of a surface display are potentially met for all observers in a full hemispherical solid angle: the shallower shape of cap 720 relative to cap 700 is partially offset by its greater diameter.

A somewhat different situation is illustrated for the embodiment of FIGS. 20A and 20B, in FIG. 26. In this embodiment a disk shaped cap 740 mounted on a stem 742 has a flat front face 744 and a circumferential or cylindrical face 746. Provided that a thickness of disk shaped cap 740 is greater than ¼", in the illustration, considered to be approximately ⁵⁄₁₆", the two above considered conditions for substantial visibility of a surface display are clearly potentially met for a grazing line-of-sight of a display on the circumferential face 746. The critical line-of-sight is therefore not one parallel to front face 744, but one deviating at an angle of 70° from a normal N to the front face. This is because at shallower angles of view the front face itself, here considered to have a diameter of approximate 2", will meet the above considered conditions for substantial visibility. Beyond this angle the front face does not meet the above conditions, which therefore must be met by the circumferential face 746 if substantially visibility is to be maintained.

It is found by direct construction that the distance subtended by face 746, or a perpendicular separation between lines 748 and 750, is greater than ¼". Since a larger distance will be subtended by face 746 in all lines of sight at greater angles from normal N, and at least up to grazing line-of-sight, a display on faces 744 and 746 together of the device of FIG. 26 is again found to be potentially substantially visible through a full 180° or hemispherical range of line-of-sight. It will be appreciated by those skilled in the mathematical arts that faces 744 and 746 taken together may be described as a single "convex face", that is, meet the mathematical definition of convexity. Therefore this case is understood to be covered by the language "convex face" in claiming the invention.

It is to be understood that the dimensions given in FIGS. 24, 25 and 26 are to be regarded as approximate, and intended to illustrate the geometrical concepts only rather than be relied upon as precise dimensions of a particular embodiment.

In general, it is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A heat alert safety device attachable to a surface for warning individuals that the surface is hot, comprising:
   a thermochromic composition,
   a container for housing said composition and having a convex face, said face overlying said composition and said container being transparent in at least a portion of the container overlying the thermochromic composition, said container made of a heat conductive material,
   the thermochromic composition shaped in a predetermined symbol or in the background of such symbol which communicates that the surface is dangerously hot, the symbol substantially visible through the convex face of the container and designed to undergo and maintain a readily perceptible color change whenever the temperature of the hot surface exceeds a predetermined temperature,
   an attachment element made of a heat conductive material and bonded to said container, said attachment element being attachable to a surface which may become hot,
   the convex face being substantially visible through an angle of incidence of at least 90 degrees,
   the container and the attachment element together forming a circular shape.

2. A heat alert safety device attachable to a surface for warning individuals that the surface is hot, comprising:
   a thermochromic composition,
   a container for housing said composition and having a convex face, said face overlying said composition and said container being transparent in at least a portion of the container overlying the thermochromic composition, said container made of a heat conductive material, the thermochromic composition shaped in a predetermined symbol or in the background of such symbol which communicates that the surface is dangerously hot, the symbol substantially visible through the convex face of the container and designed to undergo and maintain a readily perceptible color change whenever the temperature of the hot surface exceeds a predetermined temperature,
   an attachment element made of a heat conductive material and bonded to said container, said attachment element being attachable to a surface which may become hot,
   the convex face being substantially visible through an angle of incidence of at least 90 degrees,
   wherein a stem is mounted between said convex face of said container and said attachment element to offset the convex face of said container from said surface, said stem made of heat conducting material.

3. The device of claim 2, wherein a pivot element is formed at a junction of said convex face of said container and said stem, said pivot element enabling the convex face of said container to be positioned by a user in a range of angles with respect to said surface, in order to vary a zone of maximum viewing effectiveness.

4. The device of claim 1, wherein a pivot element is formed at a junction of said container and said attachment element, said pivot element enabling said container to be positioned by a user in a range of angles with respect to said surface, in order to vary a zone of maximum viewing effectiveness.

5. The device of claim 4, wherein said attachment element is a magnet.

6. The device of claim 5, wherein said magnet is a ceramic magnet.

7. The device of claim 5 wherein said magnet is an alnico magnet.

8. The device of claim 4, wherein said attachment element is a high temperature thermally conductive cement.

9. The device of claim 1, wherein said attachment element is a suction cup.

10. The device of claim 1, wherein the composition is recessed in a second, planar, face of said container, and the container is made of glass.

11. The device of claim 1, wherein the composition is recessed in said convex face, and the convex face is further covered with a transparent vitreous coating.

12. The device of claim 1, wherein said convex face is comprised of a generally planar and a generally cylindrical sub-face.

13. The device of claim 1, wherein said thermochromic composition is a liquid crystal.

14. The device of claim 13, wherein said liquid crystal is a cholesteric liquid crystal.

15. The device of claim 1, wherein said thermochromic composition is a semiconductor.

16. A heat alert safety device attachable to a surface for warning individuals that the surface is hot, comprising:

a thermochromic composition, a container for housing said composition and having a convex face, said face overlying said composition and said container being transparent in at least a portion of the container overlying the thermochromic composition, said container made of a heat conductive material, the thermochromic composition in a shape of the letters "HOT", the letters substantially visible through the convex face of the container and designed to undergo and maintain a readily perceptible color change whenever the temperature of the surface exceeds a predetermined temperature, an attachment element made of a heat conductive material and bonded to said container, said attachment element being attachable to a surface which may become hot, the convex face being substantially visible through an angle of incidence of at least 90 degrees, the container and the attachment element together forming a circular shape.

17. A heat alert safety device attachable to a surface for warning individuals that the surface is hot, comprising:

a thermochromic composition, a container for housing said composition and having a convex face, said face overlying said composition and said container being transparent in at least a portion of the container overlying the thermochromic composition, said container made of a heat conductive material, the thermochromic composition in a shape of the letters "HOT", the letters substantially visible through the convex face of the container and designed to undergo and maintain a readily perceptible color change whenever the temperature of the surface exceeds a predetermined temperature, an attachment element made of a heat conductive material and bonded to said container, said attachment element being attachable to a surface which may become hot, the convex face being substantially visible through an angle of incidence of at least 90 degrees, wherein a stem is mounted between said convex face of container and said attachment element to offset the convex face of said container from said surface, said stem made of heat conducting material.

18. The device of claim 17, wherein a pivot element is formed at a junction of said convex face of said container and said stem, said pivot element enabling the convex face of said container to be positioned by a user in a range of angles with respect to said surface, in order to vary a zone of maximum viewing effectiveness.

19. The device of claim 16, wherein a pivot element is formed at a junction of said container and said attachment element, said pivot element enabling said container to be positioned by a user in a range of angles with respect to said surface, in order to vary a zone of maximum viewing effectiveness.

20. The device of claim 19, wherein said attachment element is a magnet.

21. The device of claim 20, wherein said magnet is a ceramic magnet.

22. The device of claim 20 wherein said magnet is an alnico magnet.

23. The device of claim 19, wherein said attachment element is a high temperature thermally conductive cement.

24. The device of claim 16, wherein said attachment element is a suction cup.

25. The device of claim 16, wherein the composition is recessed in a second, planar, face of said container, and the container is made of glass.

26. The device of claim 16, wherein the composition is recessed in said convex face, and the convex face is further covered with a transparent vitreous coating.

27. The device of claim 16, wherein said convex face is comprised of a generally planar and a generally cylindrical sub-face.

28. The device of claim 16, wherein said thermochromic composition is a liquid crystal.

29. The device of claim 28, wherein said liquid crystal is a cholesteric liquid crystal.

30. The device of claim 16, wherein said thermochromic composition is a semiconductor.

31. A heat alert safety device attachable to a surface for warning individuals that the surface is hot, comprising:

a thermochromic composition, a container for housing said composition and having a convex face, said face overlying said composition and said container being transparent in at least a portion of the container overlying the thermochromic composition, said container made of a heat conductive material, the thermochromic composition shaped in a predetermined symbol or in the background of such symbol which communicates that the surface is dangerously hot, the symbol substantially visible through the convex face of the container and designed to undergo and maintain a readily perceptible color change whenever the temperature of the hot surface exceeds a predetermined temperature, an attachment element made of a heat conductive material and bonded to said container, said attachment element being attachable to a surface which may become hot, the convex face being substantially visible through an angle of incidence of at least 90 degrees, wherein a stem is mounted between said container and said attachment element to offset the container from said surface, said stem made of heat conducting material.

32. A heat alert safety device attachable to a surface for warning individuals that the surface is hot, comprising:

a thermochromic composition, a container for housing said composition and having a convex face, said face overlying said composition and said container being transparent in at least a portion of the container overlying the thermochromic composition, said container made of a heat conductive material, the thermochromic composition in a shape of the letters "HOT", the letters substantially visible through the convex face of the container and designed to undergo and maintain a readily perceptible color change whenever the temperature of the surface exceeds a predetermined temperature, an attachment element made of a heat conductive material and bonded to said container, said attachment element being attachable to a surface which may become hot, the convex face being substantially visible through an angle of incidence of at least 90 degrees, wherein a stem is mounted between said container and said attachment element to offset the container from said surface, said stem made of heat conducting material.

* * * * *